Dec. 22, 1970    R. B. TROUSDALE ET AL    3,549,995
MULTIBRIDGE COMPARISON SYSTEM FOR WIRING TESTING
Filed Sept. 2, 1964    8 Sheets-Sheet 1
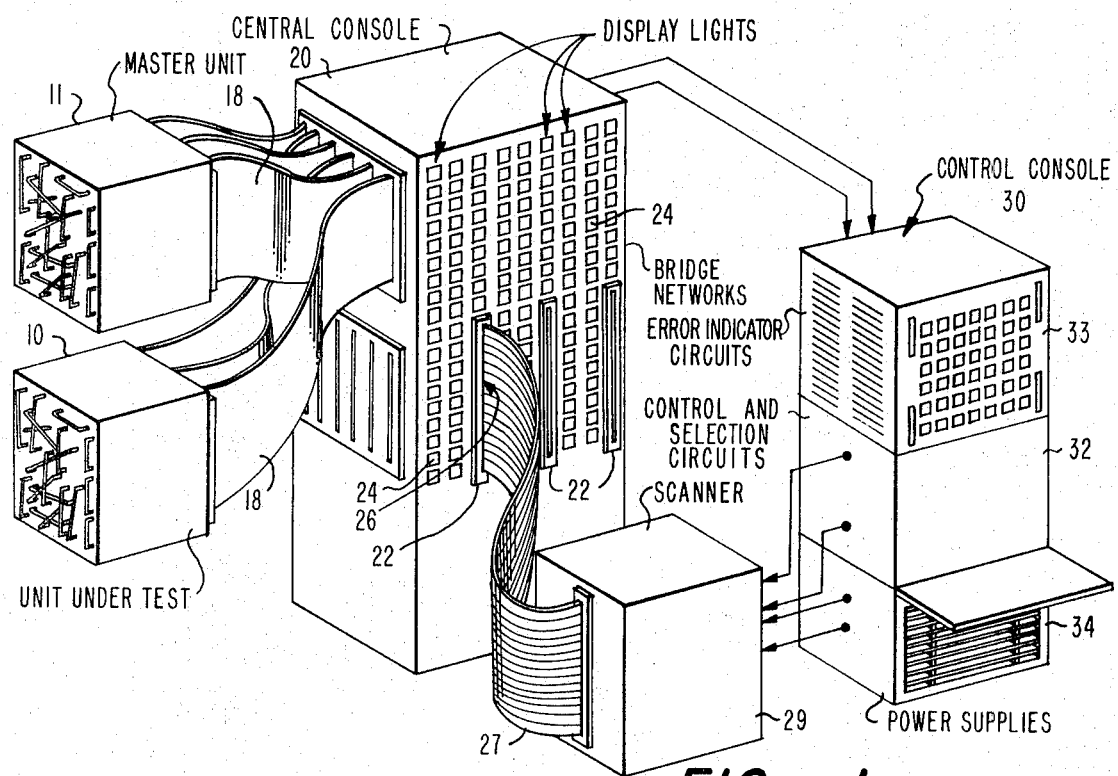
FIG.—1
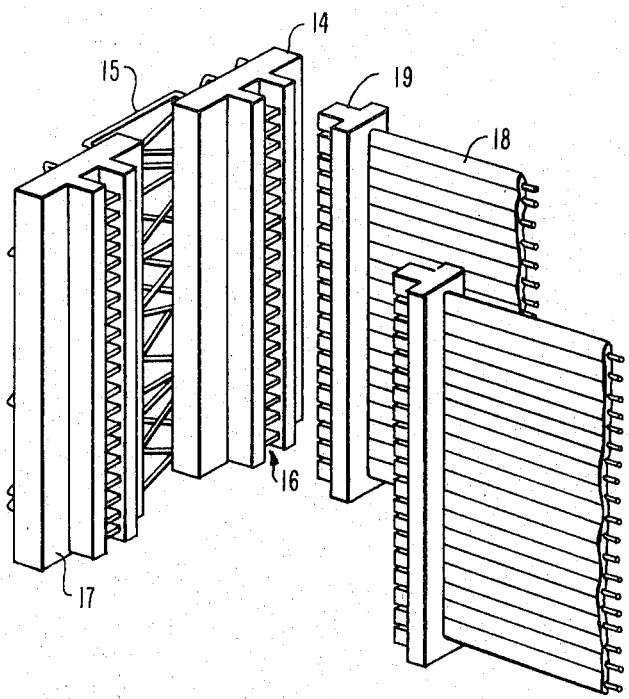
FIG.—2
INVENTORS
ROBERT B. TROUSDALE
FRANKLYN L. WILEY
JOHN T. TESKA
BY Albert Rosen
Fraser and Bogucki
ATTORNEYS

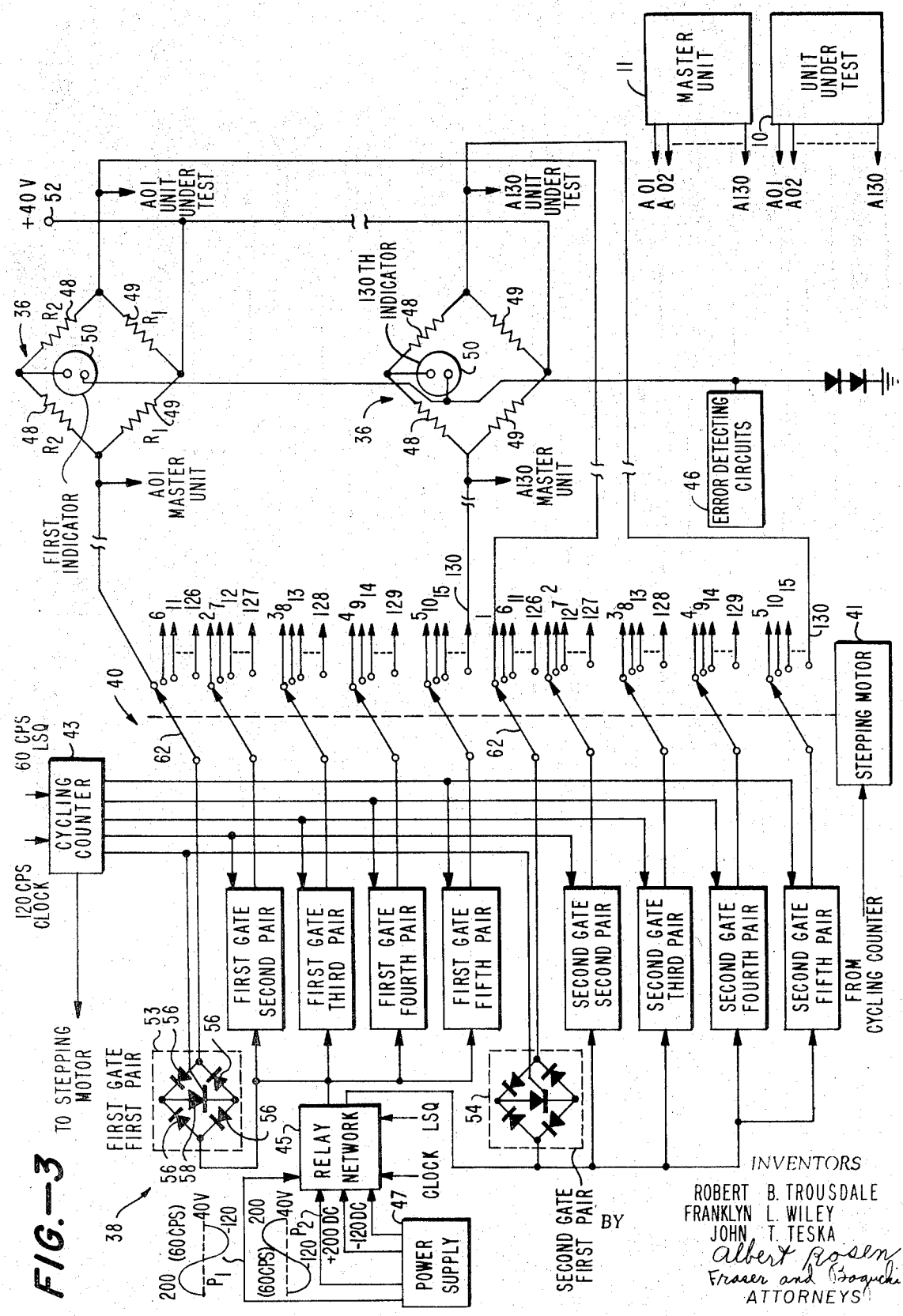

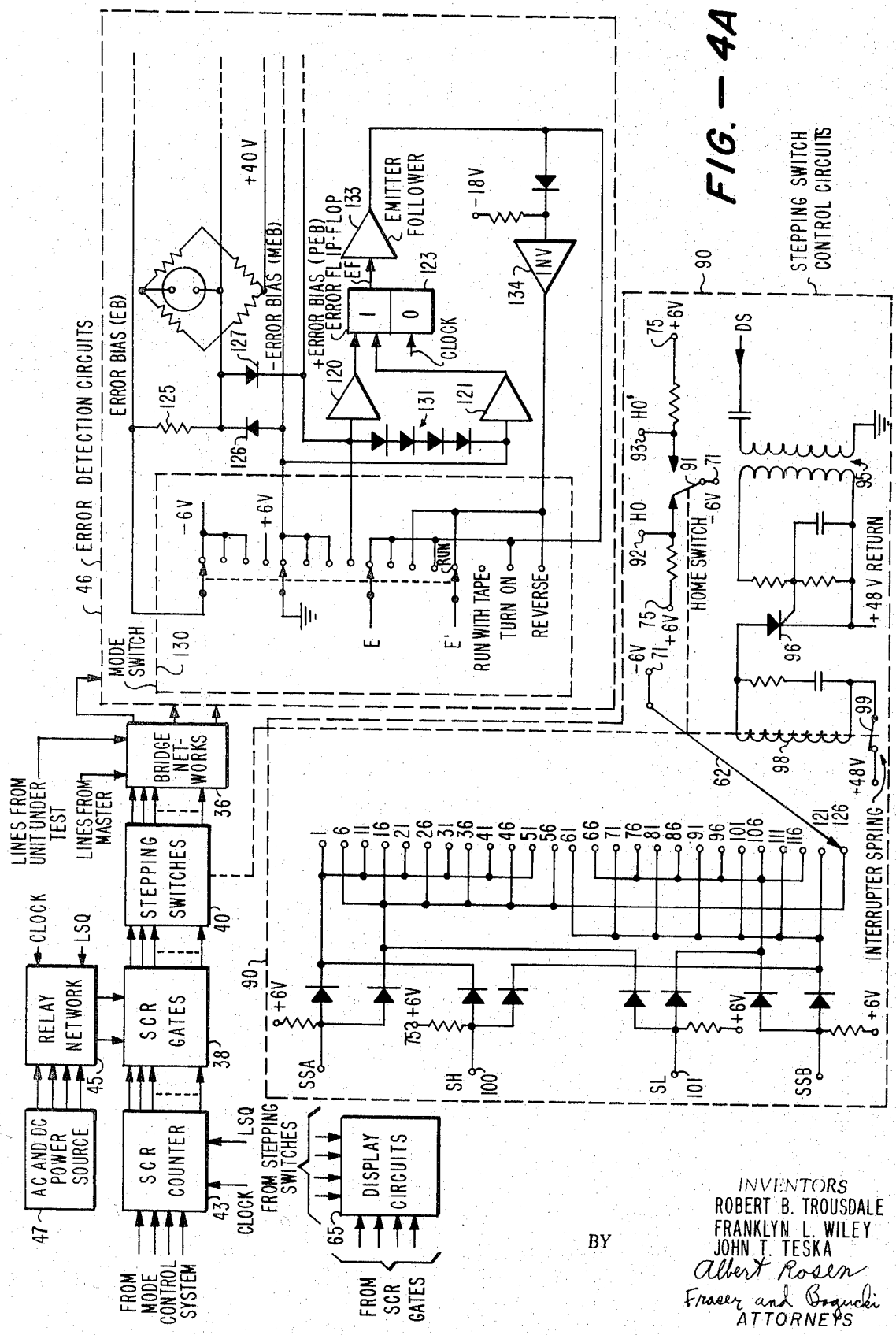

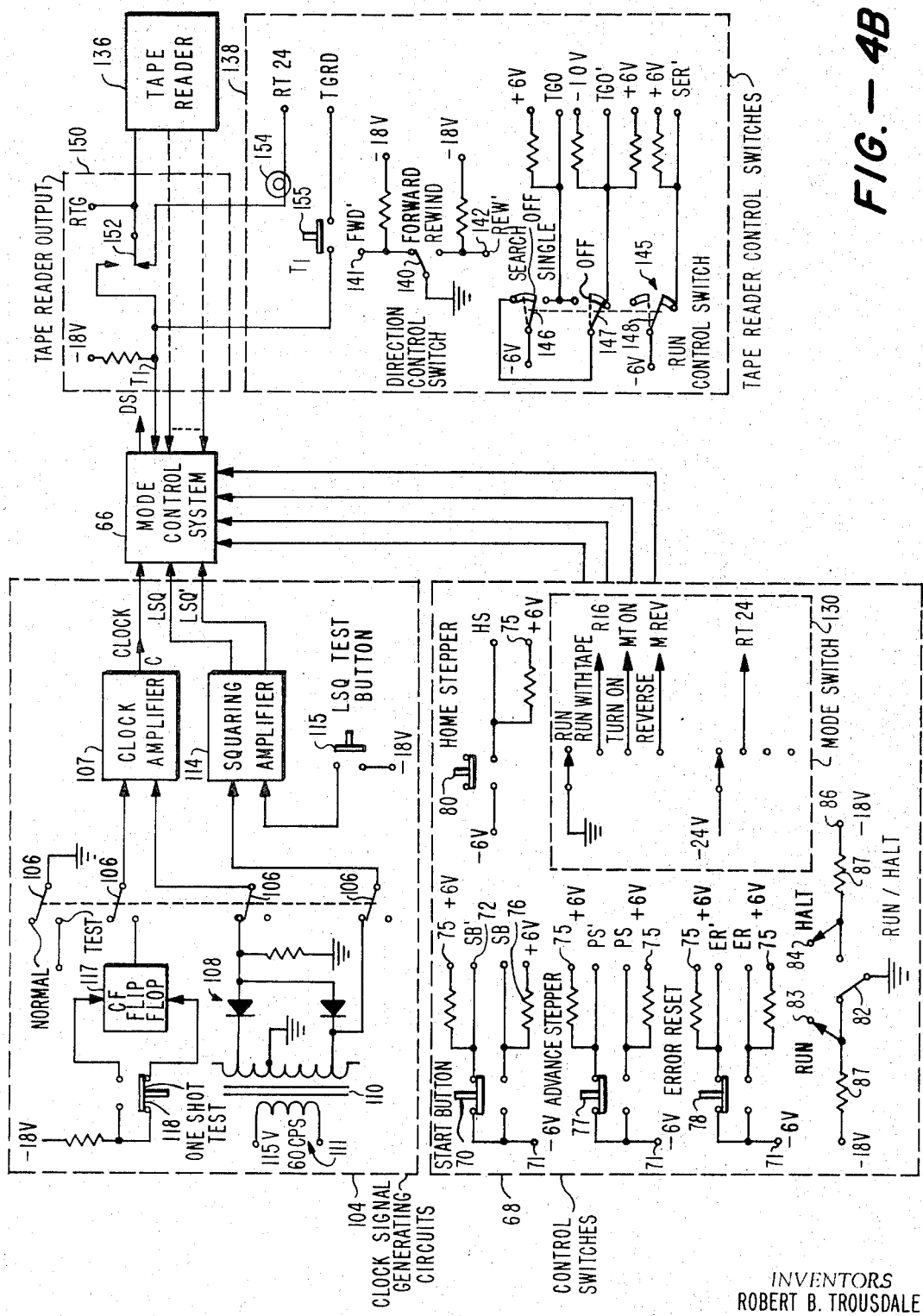

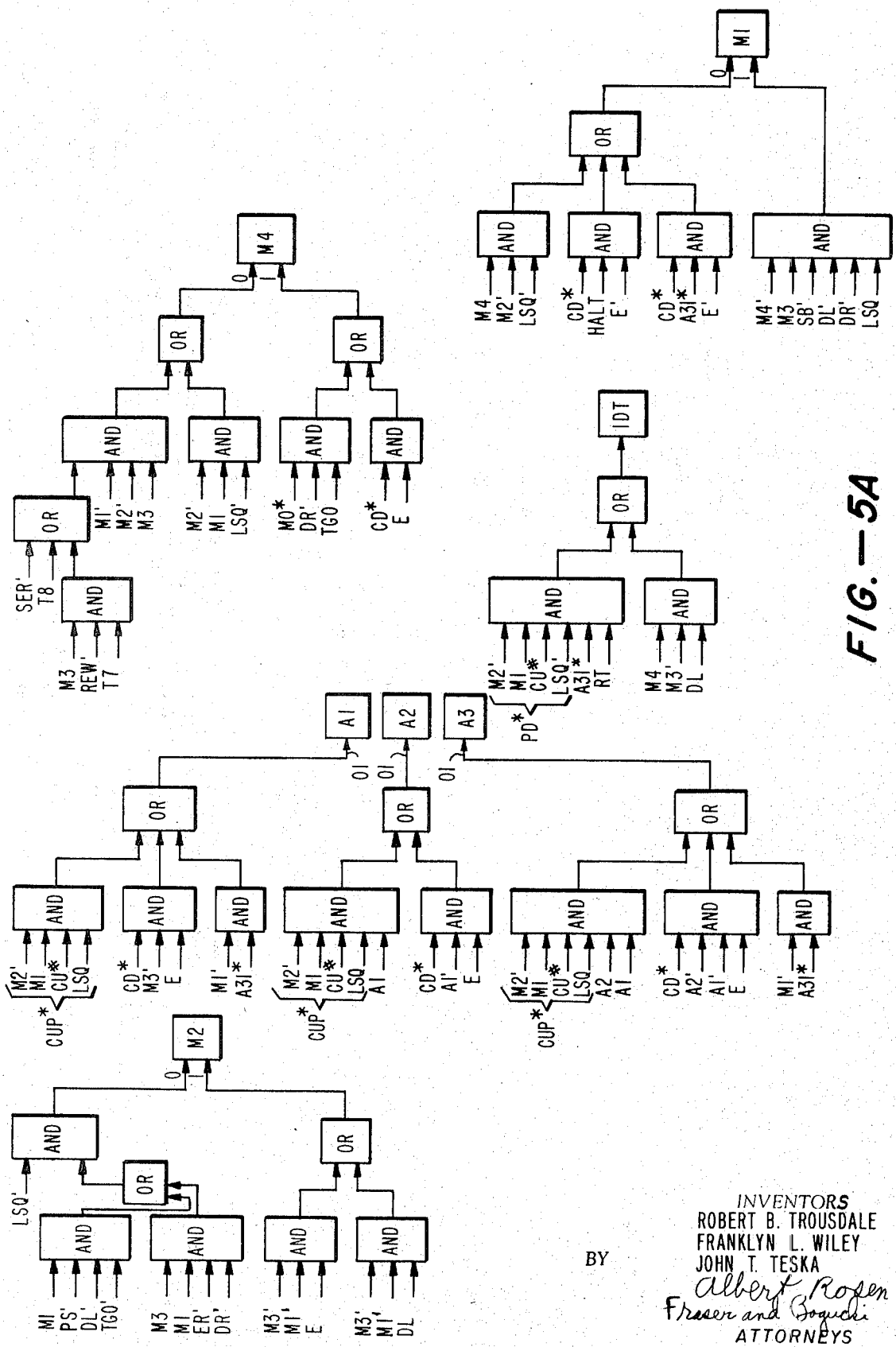
FIG.—5A

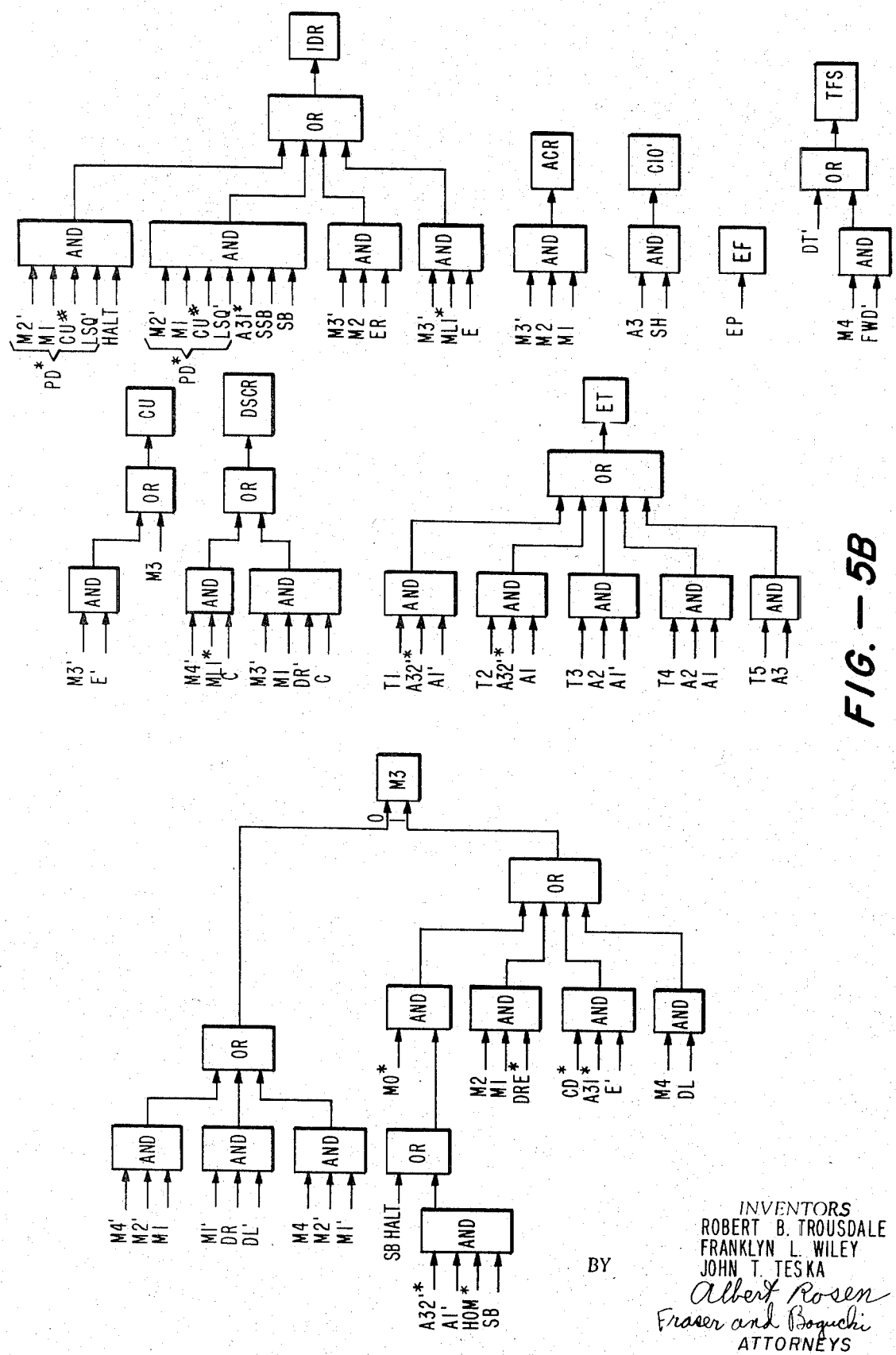
FIG.—5B

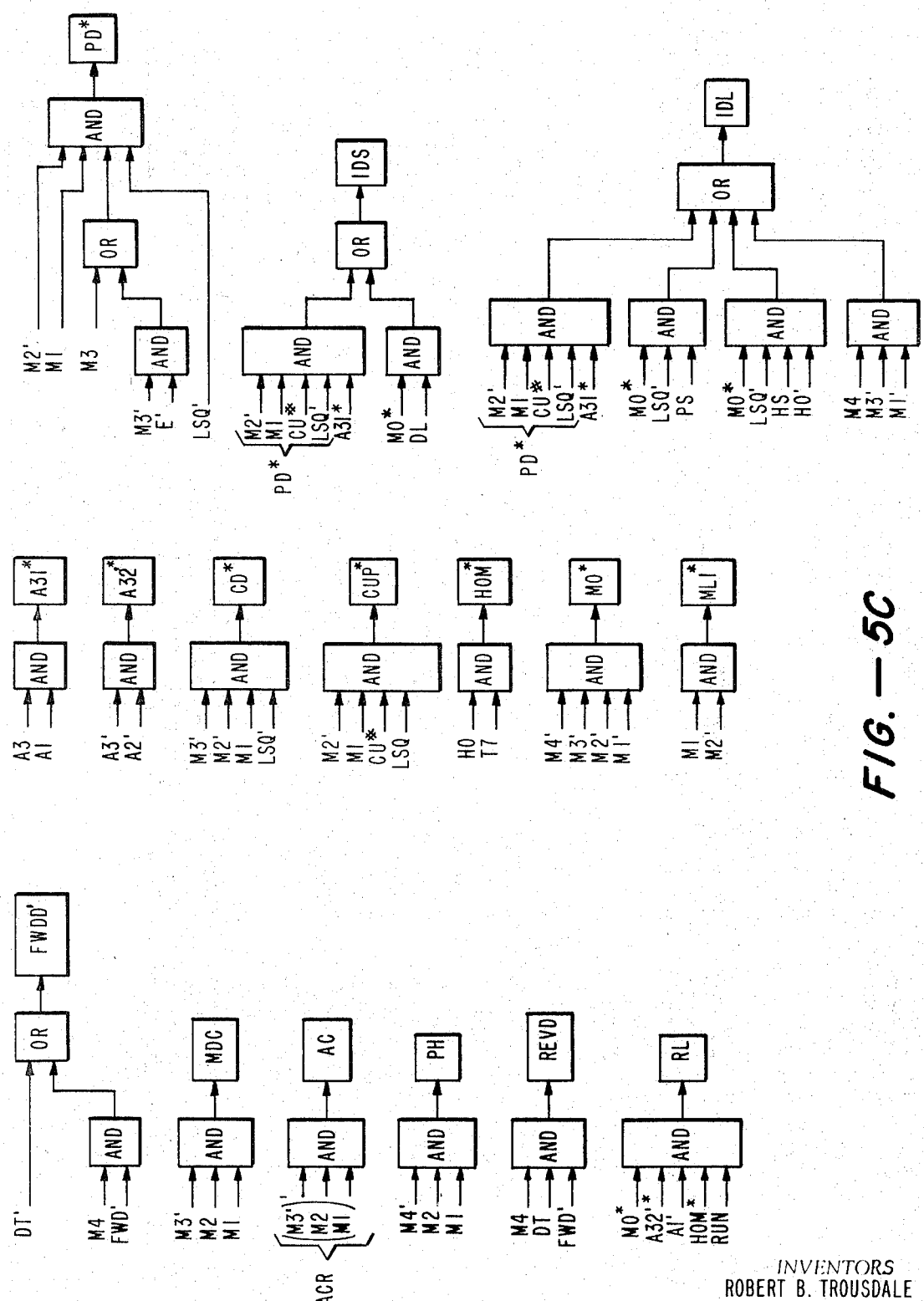
FIG.—5C

3,549,995
MULTIBRIDGE COMPARISON SYSTEM
FOR WIRING TESTING

Robert B. Trousdale, Downey, and Franklyn L. Wiley, Long Beach, Calif., and John T. Teska, Norman, Okla., assignors to California Computer Products, Inc., Anaheim, Calif., a corporation of California
Filed Sept. 2, 1964, Ser. No. 393,845
Int. Cl. G01r 15/12
U.S. Cl. 324—73                                16 Claims

ABSTRACT OF THE DISCLOSURE

A programmable, expandable, chassis wiring and cable interconnection testing system verifies circuit wiring by comparison with the wiring of an identical, previously verified master circuit. Both the type and location of wiring short and discontinuity errors are indicated by coupling the circuit to be tested and the master circuit directly to bridge networks, applying test voltages, reversing the polarity of the test voltages and sensing voltage imbalances at bridge networks other than the directly coupled bridge networks. The system include self-testing and display features and permits a chassis to be tested without prior modification for testing.

---

This invention relates to systems and methods for checking the wiring of electronic systems, and particularly to a wiring testing system which can readily be used to verify the correctness of the wiring of a variety of different systems and subassemblies.

For convenience, reliability and cost, most high quality electronic systems are now assembled on a modular basis. Electronic components are grouped together in various functional units, such as. registers, flip-flops, amplifiers, matrices and the like, and disposed in preselected groups on standardized circuit boards. One circuit board may be devoted to one or more functional units or several circuit boards may be utilized for performance of a more complex function. The circuit board includes one or more multipin connectors serving as external wiring terminals for the circuit. By the use of these standardized components, printed circuit and automatic wiring and assembly techniques are most advantageously utilized, and the circuit boards themselves may more readily be checked and replaced. In modular construction, the various circuit boards are inserted in standard chassis elements which have multipin connectors for receiving the connectors on the boards. The present invention is concerned with the problems involved in verifying the wiring connections between different parts of a modular system.

There are a number of techniques currently in use for checking chassis wiring. In some systems, punched cards are used to represent in coded form the proper wiring connections at different selected terminals. The punched card data is used either to control the preparation of a wiring interconnection card for visual checking, or to serve as the reference for the generation of comparison test voltages. In other systems, computer techniques are used to store reference data, to scan the chassis wiring, and to locate errors. Such systems, however, are extremely expensive and often limited in function. Manual checking, of course, may be carried out based on punched cards or detailed visual or electrical comparison of wired circuits to some other reference. Manual checking, however, is extremely laborious and is itself subject to a high degree of human error.

Some testing systems have been devised in which the wiring of a unit under test is compared to a master chassis which is known to be correct. Certain of these systems are highly complex, but still suitable for checking only a relatively few connections. Others utilize precise comparison of voltages and therefore demand precision components and adjustments, so that they are excessively expensive for checking complex systems. Still others are known which have a number of indicating devices which are concurrently illuminated, and which operate one or more of the illuminating devices in a flashing mode when an error exists. Most of such systems require too long for set-up, and none are adapted to provide self-checking as well as testing of a great number of connector points. Simple comparison of test points against the standard is not sufficient for practical applications, because there must also be adequate assurance that the test circuitry itself is free of error. The system design should facilitate operation under the conditions most likely to be encountered. The system should be capable of checking assemblies having differing numbers of modules, and should be expandable to accommodate additional modules if required. In addition, the services of an operator in recording and correcting errors should be utilized most efficiently during both set-up and operation. It is highly desirable to indicate the type of error as well as its location. Further, successive testing of wiring points should be controllable manually, or under a stored program, so as to adopt the system to particular testing requirements.

It is therefore an object of the present invention to provide an improved system for testing chassis wiring and cabling interconnections in an electronic system.

It is an object of the present invention to provide improved methods of checking wiring interconnections.

Another object of the present invention is to provide an improved short and continuity tester, for verification of wiring interconnections in a modular electronic chassis construction.

A different object of the invention is to provide improved test circuits for comparing one set of wiring interconnections to another.

Another object of the invention is to provide an improved wiring testing system for electronic systems which does not require that the chassis under test be modified in any respect.

A further object of the present invention is to provide an improved device for testing chassis wiring and cabling with high reliability, with ready indication of existing errors, and with self-testing features.

These and other objects of the present invention are achieved by a system which compares the wiring interconnections of a unit under test against those in a master chassis which is known to be correct. Different standardized bridge circuits are utilized for each point to be compared, these bridge circuits being coupled with neon indicators such that when a disparity exists between the wiring of the unit under test and the master chassis a neon is fired due to a voltage imbalance at one of the bridge circuits. The system performs short and continuity tests at each terminal generating appropriate error and location indications on a display panel.

A feature of the present invention is the utilization of bridge network arrangements and low cost neon indicating tubes in conjunction with a two-phase testing sequence, such that improper connections (shorts) and discontinuities (missing wires) may appropriately be indicated during an automatic testing sequence. By interconnection of similar circuits points between the master unit and the unit under test all bridge circuits are maintained in balance and none of the neons are lighted even though test voltages are applied across the bridges. At each test point, networks and neon tubes are so related to the voltages that a neon tube is fired only upon application of one of the test voltages alone. If the wiring in the unit under test is improper, one or more bridge networks at other points will become unbalanced. The imbalance is sufficient to fire the associated neons and energize error detection circuits, with the phase of occurrence being dependent upon the phase of the test sequence and the nature of the wiring error, whether short or discontinuity. The bridge networks are standardized components of low cost, but the arrangement allows for component variations to insure reliable operation.

In a specific example of a system in accordance with the invention, a two-step sequence is employed, in each of which actuating voltages of opposite polarity derived from the alternating current power wave are applied to opposing sides of the bridges. For example, in a first half-cycle a positive voltage is supplied to the side of the bridge network connected to the master chassis and a negative voltage is applied to the side connected to the chassis under test. In the second half-cycle the voltages are reversed. A scanning system in accordance with the invention rapidly applies these voltages to each of the successive bridge networks in order, under timing control signals derived from an applied alternating current power signal. The error indication circuits operate to stop the scanning and to increase the neon brightness when an error of either kind has been detected. The operator is therefore enabled to identify the point of the error, the nature of the error, and by reference to the actuated neons, the specific error itself.

Another feature of the invention is the arrangement of the wiring system for optimum combination of automatic and manual system functions. A system of wiring interconnections is provided in which ribbon cabling may be connected from separate banks on the test panel to the master chassis and to the unit under test such that 10,000 or more wiring points may be set up for comparison in a relatively few minutes. These testing interconnections are not changed during subsequent testing, but the test panel is arranged with a single plug-in transmitting cable bank, which may be inserted into any of the number of testing and display banks. An aspect of the invention is that the number of testing and display banks may be extended indefinitely. The operator inserts the transmitting cable bank manually in any given test bank location, and the automatic scanning circuits sequence through the separate test points in the display bank, with the tests being made as previously described. For simplicity and cost, a combination of rapid electronic and relatively slower electromechanical scanning is used, with the electronic scanner moving through a number of steps at each position of the electromechanical scanner. Inasmuch as the operator must be present to set up the cabling, to correct errors, direct tests, and to verify wiring corrections, the employment of the single transmitting cable bank and a number of test banks materially simplifies the scanning system which is required, and materially reduces system cost without materially delaying testing operations.

Another feature of the present invention is the utilization of test modes by which the operability of the various bridge networks and neons may be verified. Thus, prior to testing a positive voltage alone may be applied across the bridge networks, firing all of the neon bulbs to insure that they are operable. Then a negative voltage alone may be applied, to insure the neon bulbs are not fired unless there is an adequate change in potential.

Methods in accordance with the invention utilize a plurality of individual networks as above described which are interconnected only through the wiring of the master unit and unit under test. Although test voltages are applied to one network directly, imbalances exist and are detected only at other networks, dependent upon the similarity of the wiring connections at the two units.

The scanning and self-testing procedures are carried out automatically under control of a test console. Because it is often desired to omit or ignore tests of selected terminals, the system is arranged to operate with a program device, such as a paper tape reader. Under control of signals from the tape reader, any of the test points may be selectively skipped. Whether the tape reader is used or not, the system proceeds through a number of modes which insure that proper timing is achieved for the different scanning functions. The mode control is such that the various units may be stepped singly or continuously, and the locations and types of errors are both indicated and identified.

A better understanding of the invention may be had by reference to the following description, taken in conjunction with the accompanying drawings, in which:

FIG. 1 is a generalized block diagram representation of a testing system in accordance with the present invention;

FIG. 2 is a detailed partial perspective view, in simplified form, of elements by which wiring connections are made in systems in accordance with the invention;

FIG. 3 is a detailed block diagram and partial schematic diagram of a portion of a system in accordance with the invention, showing scanning, switching, comparing, and error detecting circuits;

FIG. 4A–4B are a general block and schematic diagram of a wiring testing system in accordance with the invention, showing a tape reader and other control units;

FIG. 5A–5C are a detailed block diagram of the principal functional testing system in accordance with the invention.

Figure 6:
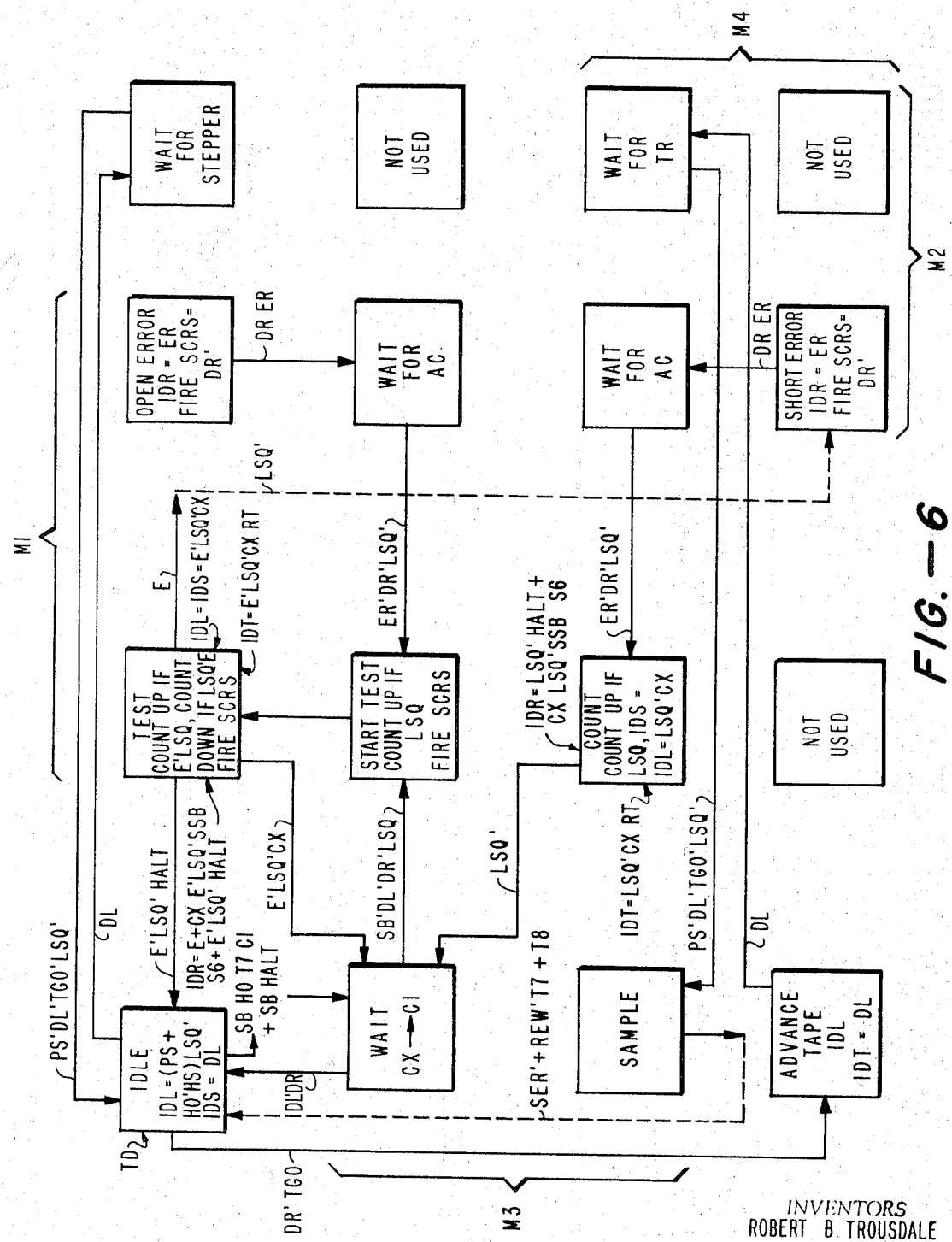
FIG. 6 is a Veitch diagram of successive system operative states, useful in describing the operation of the arrangement of FIG. 5.

Referring now to FIG. 1, a system in accordance with the invention is used to check a modular unit under test 10 against a like master unit 11 which has been verified as having correct wiring. As shown in more detail in FIG. 2, an individual modular wiring panel 14, which may be of standard configuration, typically has a multiplicity of wiring interconnections 15 on one side and associated female connector elements 16 on the other. The wiring interconnections 15 couple individual pins on the panel 14 to adjacent panels, such as the panel 17. Standard plug-in circuit cards (not shown) may then be inserted into the female connector 16. Each of the female connectors 16 has a number of serially disposed contact pairs which mate with complementary male contacts on the circuit cards, thus completing circuit connections between various electronic components of the different circuit cards through the wiring 15. For testing, however, a multiconnector ribbon cables 18 having male connector elements 19 are inserted to connect the unit under test 10 and the master unit 11 to a central console 20.

Although the present example of FIGS 1 and 2 is of particular advantage for most systems to be tested, it should be recognized that the arrangement of the test points and the configurations of the connectors which are used are not of critical importance. These factors depend upon the modules which are to be tested, so that the size of the components involved and the plug-in test wiring itself may vary greatly between different forms of wired assemblies. Systems in accordance with the invention may be used for checking a great variety of assemblies, although it will be recognized that the purposes and conditions of testing may vary. For example, the levels of the applied test signals may have to be adjusted to levels which can be accepted by the wiring of the master unit and the unit under test.

The central console 20 includes separate bridge network circuits and display devices for each of the test points of the unit under test and the master unit, these being described in detail below. The central console 20 is shown as having three test banks 22, although as will be apparent the number of these test banks may be extended substantially indefinitely. In a practical example of a system in accordance with the invention, 72 test banks each having 130 test points are utilized. In the present example, it is assumed that each test bank similarly uses 130 pins, and that the displays 24 consist of 130 successive neon indicator bulbs.

A single transmitting cable bank 26 which may be inserted into any one of the test banks 22 connects through ribbon cabling 27 to a scanner 29 which operates under the command of a control console 30. The control console 30 includes control and selection circuits 32, which effect the two-phase test sequences and the various self-test sequences. Error indicator circuits 33 which are coupled to the various bridge networks, and which include display circuits and devices are also included on the control console 30. Power supplies 34 are also coupled through the scanner 29 to the various test points.

In the operation of this system, the system is first set up for test by the operator, who systematically couples the ribbon cables 18 for each test bank on the control console 20 to corresponding points on the two electronic assemblies, the master unit and the unit under test 10. Because the units 10 and 11 are alike in structure and because the ribbn cables 18 are arranged in orderly fashion, the pair of connectors may be inserted very rapidly and without error, even though 10,000 or more test points may be involved. If a cable 18 is inserted improperly, errors are of course indicated when performing the test sequence.

The operator may then insert the transmitting cable bank 26 in a first of the test positions at the front of the central console 20. At this point, he may desire to verify that the bridge circuits are operating correctly and may therefore actuate the control and selection circuits 32 appropriate for this purpose. Self-test features (to be described in detail below) verify that all of the neons are operating correctly and that the proper balance is maintained in the operation of the various bridge networks. If desired, the self-testing may be carried out prior to each operation at a test bank, although in the usual instance it will be sufficient to make only periodic tests of the operation of the system, inasmuch as error is unlikely to occur.

With the transmitting cable bank 26 in position, the successive test positions are rapidly scanned. The wiring comparison for each test point is made in two-phase sequence, in a first of which the unit under test 10 is checked for the absence of a wire or wires, and in the second of which the unit 10 is tested for improperly connected wires (shorts). Wherever an error exists, the error indicator circuits 33 and the associated displays provide an appropriate indication, and the system stops at the point to permit the operator to make the necessary notations or corrections. As directed by the operator, the system then continues on to the next error or the end of the test bank. Inasmuch as the presence of an operator is required to install the original ribbon cable connections to the two units, to make wiring corrections, and to observe misconnections and verify the self-testing modes, the amount of test and control circuitry is advantageously minimized.

In addition, the utilization of manual selection of the various test banks permits the number of test banks to be essentially independent of the control and selection circuits 32 and the scanner 29. Thus, only a part of test banks need be utilized, or the test bank system may be extended indefinitely.

Once tests have been completed at a given test bank, the operator simply withdraws the transmitting cable bank from that test bank and inserts it in the next, and the sequence is then repeated. It has been found in practice that the wiring of a 10,000 pin chassis may be verified for both continuity and discontinuity by a relatively unskilled operator in 15 minutes or less. The nature of the error indication materially assists in permitting unskilled personnel to make the necessary corrections. When an error exists at a given point, the system stops with the display indicators of the error indicator circuits 33 designating the pin involved. The neons which are lit, however, are those associated with other bridge networks which become unbalanced by reason of the continuity or discontinuity error. The neons thus indicate the erroneous circuit paths, and may be followed in changing the wiring of the unit under test.

FIG. 3 is a simplified, combined schematic and block diagram representation of scanning, measuring and indicating circuits in accordance with the invention. Leads, designated A01, A02 . . . A130 are taken from the master unit 11 and the unit under test 10 and coupled as by the ribbon cabling in the arrangements of FIGS. 1 and 2 to correspondingly designated points in the measuring and indicating circuits. In order to simplify the description, the various self-testing, timing and other associated control circuits are not shown in detail, inasmuch as these are discussed specifically below. The arrangement of FIG. 3 may be said to comprise generally a group of 130 bridge networks 36, only the first and 130th of which have been shown, a scanning system comprising five pairs of electronic gates 38 and electromechanical stepping switches 40 with 10 banks arranged in five pairs, each bank having 26 output terminals, a stepping motor 41 for advancing the stepping switches 40 in response to applied signals, an electronic cycling counter 43 for controlling the electronic gates 38 for actuation of the bridge networks 36, and error detecting circuits 46 coupled to each of the bridge networks 36. By combining the electronic and electromechanical switching functions in the scanner, an optimum combination of speed, reliability and economy is achieved in scanning the 130 test positions.

Each bridge network comprises a like pair of resistors 48 on one side, and a different like pair of resistors 49 in the remaining arms. A small neon tube 50, such as type Ne–2S is coupled to the midpoint between resistors 48 while a biasing voltage is provided from a +40 volt source 52 to the opposite midpoint between resistors 49. Test voltages are applied to the two remaining terminals of the bridge network 36, and the test circuits (e.g., A01) are coupled to these like terminals. Note that the bridge networks 36 are not coupled directly together by any circuit path except through the wiring of the two units 10, 11.

The relay network 45 is coupled to a power supply 46 to receive alternating current waves which vary sinusoidally at 60 c.p.s. about a base of +40 volts, so that peak amplitudes of +200 and −120 volts are established. Two opposite phase AC waves are given the phase designations $\phi 1$ and $\phi 2$ respectively. The relay network 45 couples one alternating current signal to all first gates in the various pairs in the electronic gates 38, and couples the opposite-going signal to the remaining gates. +200 v. and −120 v. DC signals are also applied to the relay network 45 from the power supply 47.

In the electronic gates 38, only the two gates 53, 54 which comprise the first pair have been shown in detail. Each gate comprises a full wave rectifier bridge in which the rectifier diodes 56 are coupled so that the gate is controlled by a silicon-controlled rectifier 58 which is turned on and off by the cycling counter 43. The cycling counter 43 may be a conventional ring type of counter or register having five successively activated stages. Or, the counter may comprise three flip-flops with interconnecting logic circuits arranged to advance the count in binary fashion under applied clock and LSQ signals. Conventional decoding circuits forming parts of the cycling counter 43 then successively activate the individual gates. Clock pulses derived as described below, are applied at a 120 c.p.s. rate and the LSQ signal which designates the alternate clock pulses is applied at a 60 c.p.s. rate. A delay is introduced in the counting sequence at the end of each fifth count, at which time the cycling counter 43 activates the stepping motor 41. The delay is sufficient to permit stepping of the switches 40. The means for accomplishing this is also described in detail below.

The first group of stepping switches 40 each comprises a 26 position switch, the central armature 62 of which is coupled to a different one of the electronic gates 38 comprising the first gate of a pair. The stepping switches 40 will typically comprise a multipole stepping mechanism of conventional form. Each of the output terminals of the switches 40 is connected to one input terminal of a different individual one of the bridge networks 36. The central armature 62 of each of the remaining stepping switches 40 is coupled to the individual second gates 54 in the electronic gates 38. The output terminals of these switches are coupled to the opposite input terminals of the bridge networks 36 in individual succession. Accordingly, the first and second gates 53, 54 that are shown in schematic form comprise a first pair, coupled to the opposite input terminals of the first bridge 36.

Thus the combination of electronic gates 38 and stepping switches 40 may be seen to provide the equivalent of a 130 position, two pole switch which applies test voltages of 200 volts and —120 volts on the opposite test points of each bridge network 36 at peak amplitudes in each half-cycle of the 60 cycle power wave. With the cycling counter 43 in the active state at the first position, for example, and with the stepping switch 40 armatures 62 at the first position, the silicon controlled rectifiers in the first gate 53 of the first pair and the second gate 54 of the first pair are turned on. A circuit is then completed through the relay network 45 and the first gate pair between the power supply 47 and the first bridge network 36. In the first half-cycle of the 60 cycle signal, therefore, a +200 volt signal is applied to the terminal to which is coupled pin A01 of the master unit, while a —120 volt signal is applied to the terminal to which is coupled pin A01 of the unit under test. Because none of the remaining electronic gates 38 are turned on, and because the stepping switches 40 are positioned at their first output terminal at this time, only the one bridge network at which the first indicator is positioned is activated by the test voltages.

The operaton of the bridge network 36 in cooperation with the neon indicator 50, however, should be fully appreciated. At the point under test, here A01, the neon indicator 50 will not light, because the bridge will remain in balance during both half-cycles of the two phase test sequence. The midpoint between the resistors 48 to which the neon indicator is coupled will, during both half-cycles, be at +40 volts, or at exactly the same voltage as the midpoint between the opposing resistors 49. This voltage of +40 volts is insufficient to fire the neon indicator 50, and so no voltage variation appears at this terminal to activate the error detecting circuits 46.

If an error has been made in the wiring coupled to the test point A01 in the unit under test 10, relative to the verified wiring at the same point in the master unit 11, the neon indicators 50 will be energized at some other point or points in the test bank. The bulbs which fire for a particular condition depend upon whether the error is a short or a discontinuity, and on where the improper wiring exists. The test terminals of the bridge networks are coupled into the wiring interconnections in the unit under test 10 and the master unit 11, and then to the other bridge networks 36. If the wiring interconnections are alike, voltage levels at the other bridges are also alike.

All points on each wiring chain will therefore go positive and negative together. Because like points in wiring chains are coupled to opposite terminals of each bridge network, the bridges continue to remain in balance. Imbalance results, however, when the wiring chains connected to the point under test are not alike. The imbalance fires a neon indicator only if a positive voltage exists alone at one side of a bridge network.

If a positive voltage is applied alone to one side of a bridge, the midpoint to which the neon 50 is coupled will be drawn toward +200 volts. If a negative voltage alone is applied, the indicator voltage will be drawn toward —120 volts. Considering the positive prebias of +40 volts applied from the source 52 to the opposite terminal of the bridge network 36, and the voltage drop through the resistors 48, 49, the inherent minimum breakdown voltage of the indicator 50 is selected to be such that it will fire in the presence of the +200 volt level (at the input terminal) alone, but not the —120 volt level alone. With two AC waves at the same frequency but 180° out of phase the system provides a two phase test voltage sequence for each full cycle increment of the AC wave.

The operation of this system proceeds by scanning all 130 test positions in sequence, applying the two phase test voltages to the opposite terminals of a bridge network 36 at each step. With the stepping switches 40 in the first position and the cycling counter 43 activating the first pair 53, 54 of electronic gates, the bridge network 36 which contains the first indicator 50, first receives +200 volts at the input terminal coupled to the master unit 11 and —120 volts at the input terminal coupled to the unit under test 10. In the remaining half-cycle, these voltages are reversed. At the end of a full cycle the cycling counter 43 activates the two electronic gates 38 of the second pair, so that the test voltages may be applied in corresponding fashion during the full cycle which immediately follows. At the end of the electronic scanning of the five successive positions the stepping switch is again effected. The time required to advance the stepping switch 40 by the stepping motor 41 is only one full cycle, or 1/60 of a second so that the entire 130 positions may be scanned in aproximately 2.5 seconds.

It should be noted particularly that the voltage imbalance which is required to cause a neon indicator 50 to fire at a given bridge network 36 does not exist at that bridge network which is then directly receiving the test voltages. As stated before, the directly applied voltages merely balance the network and the neon indicator device does not fire. If the wiring of the unit under test 10 corresponds to that of the master unit 11, all other bridge networks will similarly be held in balance.

Assume as a first specific example, that a wiring chain which interconnects three pins is under test and that the unit under test 10 is correctly wired. All three associated bridge networks will be excited but all three will remain in balance and no error will be indicated. As the successive bridge networks which are connected to the three interwired pins are excited, the balance conditions are repeated. If, however, there is an open circuit between the second and third pins in the unit under test 10, application of the test voltages to the first and second networks results in balance of those networks, but indication of an error during the first part of the two step test sequence, at the neon indicator for the third bridge network. This results from the fact that the interconnected wiring between the there pins of the master unit applies a +200 volt test voltage to the corresponding side of the third bridge network, but the presence of the open circuit between the second and third pins of the unit under test does not provide a compensating —120 volt condition. Therefore, at both the first and second test points, the neon indicator at the third test point fires during the first half-cycle of the 60 cycle wave, to indicate the "open" error.

This indication of an error at a point other than the point under test is useful, because it greatly facilitates the identification of the nature of the improper connection by the operator. He may refer to a wiring chart or make a visual comparison between the master unit and the unit under test, or may proceed by trial and error in some other way, but the patterns of errors and the nature of the correction which is needed become readily recognizable and corrections can be made rapidly.

On the other hand, it may be assumed that the unit under test has an improper connection in the form of a short from a two pin chain to a third pin. As the bridge networks for the first two pins are addressed, the voltage conditions remain in balance for these two bridge networks and no error is indicated at these points. Concurrently, however, voltages are applied during the test sequences to the third pin, and to the third bridge network in the sequence. The negative voltages applied during the first half-cycle do not, as previously described, fire the neon indicator 50. The positive voltages provided during the second half-cycle, however, do cause the neon indicator for the third bridge network in the wiring chain to be fired, appropriately indicating the existence of the short.

This testing principle may be expanded indefinitely, to show how more complicated cases of larger chains involving combinations of shorts and opens may be analyzed, but the above examples indicate the basic factors involved. There is of course no predetermined relationship between the wiring interconnections at the unit under test 10 and the master unit 11, relative to the sequence of test points made available to the bridge networks. A short between the given pair of pins may cause indication of an error at a point far removed along the test bank from the test point then receiving the test voltages, or may cause energization of the neon indicator for the adjacent position. In any event, errors may be identified as to location and type, then corrected by the operator and correct operation may then be verified.

OVERALL SYSTEM

The diagram of FIG. 3 illustrates in schematic form those aspects of the system which are concerned directly with signal comparison in a wiring testing system in accordance with the invention. FIG. 4 illustrates other aspects of the invention, concerned particularly with a versatile system for utilizing the wiring testing circuits in a variety of modes. In FIG. 4, various functional units have been designated similarly to their counterparts in FIG. 3, as has been done with the bridge network 36 and the stepping switches 40. The electronic gates 38 of FIG. 3 will hereafter be referred to more specifically as the SCR gates 38 in FIG. 4, these being controlled by the counter 43, which will be referred to as the SCR counter 43. Inasmuch as a conventional type of cycling counter may be utilized, and the organization of the counter itself is not significant to the invention, a detailed description of this part of the circuit will not be provided. Similarly, the display circuits 65 which indicate the point under test have not been shown in detail. These display circuits preferably include electronically operated character generator tubes, such as those sold under the "Nixie" trademark. A set of gate circuits (not shown) coupled to the SCR counter 43 and to the stepping switch control circuits may decode the stepping switch position into its decimal equivalent in conventional fashion, and present a decimal indication of the point under test. In order to economize, advantage is taken of the stepper switch design, by effecting an initial decoding by gate circuits to generate a signal SL that designates when "true" that the addressed pin has a number ending in 1 through 5, and a separate signal SH that designates that the number of the addressed pin ends in 6 through 9 or 0. Other decoding techniques for control of the display circuits 65 may readily be utilized however.

The principal elements of the mode control system 66, and their operation, are described in detail in conjunction with FIGS. 5 and 6. The mode control system 66 receives command or selection input signals from a number of different sources, and in turn provides the signals needed to perform the advance comparison and indication functions. These signals are utilized at the remainder of the units described in conjunction with FIG. 4.

Primary control is effected at the control panel by operation of any of a number of control switches 68, to provide start (SB), advance (PS), error reset (ER), home stepper (HS) and RUN or HALT signals. The operation of start button 70 is typical of most of these switches. Normally, when the start button 70 is in the nonactuated position as shown, it completes a direct circuit between a −6 volt source 71 and the SB' terminal 72, thus indicating that the SB' term is true. The convention used herein is that a term is "true" when the applicable signal is at its most negative level. Concurrently the SB terminal 74 is coupled to a +6 volt source 75 through a resistor 76, and is indicated as false. When the start button 70 is depressed, the SB terminal 74 is directly coupled to the −6 volt source 71, and the potential levels and the true and false states of the two terms are reversed. Identical circuits are utilized at the advance stepper switch 77 to generate the PS term and its complement, and at the error reset switch 78, to generate the ER term and its complement. The home stepper switch 80 is normally unconnected, inasmuch as the complement of the HS term is not utilized. The RUN/HALT switch 82 is a single pole, two position switch which is coupled to ground, and which thereby grounds either the RUN or the HALT terminal 83 or 84 respectively to generate the false condition for that term. Each of the terminals 83, 84 is coupled to a −18 volt source 86 through a resistor 87. Thus, when as is illustrated in FIG. 4 the RUN terminal 83 is grounded by the switch 82, the HALT term is rendered true because the terminal 84 is lowered toward the potential level of the −18 volt source 86.

The functions of the various control switches 68 described thus far are here briefly described for continuity. The RUN/HALT switch 82 is switched to make the RUN term true, and an individual 130 pin connector may subsequently be scanned when the start button 70 is depressed and released. Scanning is terminated at the end of the connector, or when the RUN/HALT switch 82 is moved to the opposite position, in which the HALT term is true. In this event, only one pin is tested for each depression and release of the start button 70. The error reset button 78 is used to recommence scanning after an error has caused testing to stop.

Certain additional control signals are generated in the stepping switch control circuits 90. The terminals and associated circuits coupled to one of the stepping switch armatures 62 have been shown in order to explain certain features, but it will be understood that this represents merely a part of the stepping mechanism. The stepping switch control circuits 90 include a HOME switch 91, the single pole of which is connected to the −6 volt source 71, and which couples to either an HO terminal 92 or an HO' terminal 93. When the switch 91 is in the HOME position, as shown, the HO terminal 92 is directly coupled to the −6 volt source 71, establishing that the HO term is true. Concurrently, the other terminal 93 is coupled to the +6 volt source 75 through a resistor 76 to indicate the false condition. The single pole 91 is magnetically coupled to the stepping switch coil, such that the switch 91 is in the HOME position only when the armature 62 is at position 26. For all other positions of the stepper, HO is false and HO' is true.

Certain details of the stepping circuit have been illustrated in FIG. 4, because of the manner in which the timing of the stepping action is controlled by the mode control circuits 66. A DS term is generated in the mode control system 66 and coupled through a transformer 95 across the control gate cathode circuit of a silicon controlled rectifier 96. The duration of the DS pulse is 1.0 millisecond, in this example. When the DS pulse terminates, and the DS term is in the true-false transition, the trailing edge of the pulse waveform fires the SCR 96, and energizes the stepping switch coil 98. In conventional fashion, thereafter, current is maintained in the coil 98 until the interrupter springs 99 of the stepping switch break. As the magnetic field of the coil 98 collapses, the stepping switch advances to the next position.

The stepping switch control circuits 90 also illustrate the manner in which the SH and SL signals are generated. As will be recalled in conjunction with FIG. 3, the twenty-six terminals of one bank of a five bank stepping switch vary by increments of five. The SH terminal 100, which is normally coupled to the +6 volt source 75 is directly connected to the —6 volt source 71 through the stepping switch armature 62 for each odd position of the armature 62. (Similarly, the armatures which are not shown but which represent positions 2, 3, 4, 5, and 12, 13, 14, 15, etc., are also similarly connected.) As the electronically controlled SCR gates switch through positions 1 to 5, the SH signal is at —6 volts, and the term is indicated as true. Conversely, the SL terminal 101 is connected to indicate true for each even position of the armature 62.

For convenience in locating and correcting errors, the matrix system connected to the stepping switch also generates signals to indicate whether the error is on the A side or B side of an individual connector. Details of connectors of this type are not shown in FIG. 2, but they may conventionally employ two rows of male fittings designated A and B. An SSA term is true if the A side of the connector, corresponding to connector positions 1 through 12, or position 26, is used. The B side is used for positions 13 through 25, to indicate that the SSB term is true.

As previously described, therefore, the SL and SH terms considerably simplify the problem of decoding to decimal form at the Nixie tube display. The SSA and SSB terms may be utilized to provide direct control of Nixie tube indicators, to show by an A or B symbol in which half of a connector the wiring error has occurred.

The clock signal generating circuits 104 of FIG. 4 provide a 120 cycle per second clock signal, and a logical signal LSQ and its complement LSQ' to distinguish each alternate clock pulse. Accordingly, there is a clock pulse for each phase of the test at each pin, and a phase distinguishing LSQ signal. LSQ is false (0 volts) and LSQ' is true (—18 volts) when the positive voltage is applied to the master and the negative voltage is applied to the unit under test.

In normal operation a four-pole, two position clock select switch 106 couples a clock amplifier 107 to a full wave rectifier 108 which is coupled to the center-grounded secondary of a transformer 110 connected to a 115 volt 60 cycle per second source 111. The threshold of the clock amplifier 107 is set so that the clock output makes a transition each time the input signal crosses the half amplitude level. A high gain limiting clock amplifier 107 is used to generate a rectangular wave with short rise and fall times for actuation of the associated flip-flops, one-shots and SCR's. Triggering of the flip-flops and one-shots can occur only when the clock signal makes a true-false (positive going) transition. Use of the half amplitude level as the transition point insures that the sine wave applied to the silicon controlled rectifiers provides sufficient forward bias to allow triggering when the clock signal makes a true-false transition.

A squaring amplifier 114 is coupled by the clock select switch 106 directly to one terminal of the transformer 110, to generate the phase indicative LSQ and LSQ' signals which are synchronized with the applied alternating current power signal. LSQ is in phase with the power signal, and LSQ' is 180° out of phase. If the clock select switch 106 is placed in the test position, the input signal to the squaring amplifier 114 is terminated. An LSQ test button 115 is however provided to selectively couple the input terminal of the squaring amplifier 114 to the —18 volt source. When the LSQ test button 115 is depressed, LSQ is caused to go true (—18 volts) and LSQ' is caused to go false (0 volts).

Placing the clock select switch 106 in the test position switches the input signal to the clock amplifier 107 from the full wave rectified signal to the output signal from a CF flip-flop 117. The CF flip-flop 117 is normally coupled through a one-shot test button 118 to the —18 volt source, so that the CF flip-flop 117 holds the false state and the clock signal is held true (—6 volts). When the one-shot test button 118 is depressed, the CF flip-flop is switched to the true state and the clock signal goes false (0 volts). When the one-shot test button is released, the CF flip-flop 117 switches back to the false state and the clock signal returns to the true level. In this manner, single clock pulses may be created for performing static tests.

The error detection circuits 46 have previously been discussed in conjunction with FIG. 3. A brief specific description of the circuit is provided here, however, inasmuch as particular advantages are derived, and different modes of operation are made possible, through the use of the circuit. In FIG. 4, one of the bridge networks is included for reference only, and it is to be understood that the remainder of the bridge networks are utilized as described in conjunction with FIG. 3. The + error bus (PEB) and — error bus (MEB) are coupled through separate preamplifiers 120, 121 to the one-valued input terminal of an error flip-flop 123 (EF). The error flip-flop 123 is reset to the zero state by the clock pulse. It is preferred to divide the return paths for the neon bulbs in the bridge networks into two groups to reduce the effects of leakage current. Each group then provides a return path for sixty-five bulbs through a network consisting of a resistor 125 and two silicon diodes 126, 127. The resistors 125 for all groups are returned to the error bias line (EB) and the diodes 126, 127 are returned to MEB and PEB respectively.

The error detection circuits 46 operate under control of the setting of the mode switch 130. The mode switch 130 is a six-pole, four position switch having RUN, RUN WITH TAPE, TURN ON, and REVERSE settings. Two of the armatures are shown in the control switch unit 68, but the remainder are shown in direct connection to various parts of the error detection circuits 46. The error bias line is coupled to a first pole of the switch 130, and coupled to a —6 volt source for any of the RUN, RUN WITH TAPE, or TURN ON positions. In the REVERSE position of the switch, the error bias line is coupled to the +6 volt source. In any of the first three mentioned positions the second pole of the mode switch 130 couples the — error bus to ground, whereas in the last or REVERSE position the + error bus is coupled to ground. In this manner the return lines for all of the neon bulbs are held to a few tenths of a volt negative if no bulb current is flowing. If any neon bulb turns on, positive current flows through PEB to the coupled preamplifier 120, setting the error flip-flop 123 to the one-valued state. The error flip-flop 123 is reset to the zero state at the true-false transition of the clock, the SCR's being fired at the same time. Therefore, the EF signal is true at the clock pulse following a test which resulted in a flow of bulb current. If many neon bulbs are fired, most of the current is shunted to ground through a group of diodes 131 connected between the input terminals of the two preamplifiers 120, 121. The error signal (E) and its complement E' are generated at the third and fourth poles of the mode switch 130, from the output terminals of an emitter follower amplifier circuit 133 and an inverter 134 respectively. If the mode switch 130 is in the RUN, RUN WITH TAPE or REVERSE position, the E term will be true and the E' term will be false for any test which caused neon bulb current to flow. During a TURN ON test, however, an error is present if there is no neon bulb current after a pair of SCR bridges have been fired. Therefore, the output of the amplifier 133 is connected to E' and the output of the inverter 134 is connected to E when the mode switch 130 is in the TURN ON position.

The fifth and sixth poles of the mode switch 130, in the control switch unit 68, provide a ground return line for control signals designated, R16, MT ON and M REV respectively, these corresponding to the RUN WITH TAPE, TURN ON and REVERSE positions. In the RUN WITH TAPE position, the sixth pole couples an RT24 line to a —24 volt source.

In order to test in a programmed manner, the mode control system 66 is arranged to be operated under the command of a tape reader 136, such as a conventional paper tape reading system employing an eight channel perforated paper tape. Systems of this kind, which are in wide use may move one character or step at a time at rates compatible with the stepping of the wire tester. By the use of a prepared tape, test points may be utilized or not, and thus readings which are not of significance do not slow down the operation. Inasmuch as each test position requires only an indication of test or no test, each character or frame on the paper tape is used for a number of readings. Thus as the eight parallel channels from the tape reader 136 are read concurrently at a given character, different meanings may be ascribed to the signals from each of the different channels. In the present system the parallel signals which are used are successively designated T–1 through T–5, T–7 and T–8. The T–7 signal is utilized in searching for a start position on the tape, and to designate that a frame is to be utilized and the T–8 signal is utilized in the rewind mode. The T–1 to T–5 signals represent commands for a succession of five test positions.

In the tape reader control switches 138, a direction control switch 140 may be moved to either a forward or a rewind position at like designated contact points, to generate appropriate levels at FWD' and REW' terminals. When in the forward position, the FWD' terminal 141 is coupled directly to ground, indicating that the FWD' state is false (FWD is true), whereas in the reverse direction this terminal 141 is coupled to —18 volts and therefore indicates true. Conversely, in the rewind position of the direction control switch 140, the REW' terminal 142 is set at the false level. The reverse direction of tape movement is not utilized, because the tape is programmed only in the forward scanning direction and reverse operation would require test pin scanning in reverse.

The run control switch 145 is a three pole switch having SEARCH, OFF and SINGLE positions, to generate the TGO signal and its complement and the SER' signal. The three pole three position RUN control switch 145, as shown, has a particular contact design which performs a part of the selection function. The switch 145 is shown in the central OFF position, the terminal SEARCH and SINGLE contact positions being only momentarily maintained. In either the SEARCH or SINGLE positions, the TGO terminal is coupled directly to a —6 volt source, thus indicating the true level, whereas the TGO' output terminal is held at a positive level for a false indication. Only in the OFF positions of the switch armature do the first two armatures 146, 147 maintain the TGO' term true and the TGO term false. The third armature 148 of the RUN control switch 145 has a mechanical detent which effectively provides two OFF positions, to either of which the pole returns dependent upon whether momentary engagement was to the SEARCH or SINGLE terminal. As shown in FIG. 4, the armatures 146, 147, 148 are in the OFF position after having been engaged to the SINGLE terminal. If the switch 145 is in the SINGLE position or if the switch has been returned to the OFF position from the SINGLE position the SER' terminal is coupled directly to the —6 volt source and is at the true level.

The tape reader output 150 is shown in schematic form in FIG. 4 with only one of the eight channels being shown in detail. The perforation sensor is shown schematically as a switch 152 which is indicated in the position in which a hole is sensed in the tape. In this position a return to ground (RTG) line (discussed in conjunction with the error detection circuits 46) is coupled through the sensor, here indicated as a switch 152, to the indicators on the tape reader control switches. When there is no hole in the tape at the corresponding position, the output terminal (here designated T1) is coupled directly to the RTG terminal. The RTG terminal is an open connection unless the system is in the RUN WITH TAPE mode, in which case it is a ground potential. Accordingly, the T1 or other tape reader signal is normally held true at the negative level of the —18 volt source, and goes false by being coupled directly to ground only if there is no hole in the tape and the MODE switch 130 is in the RUN WITH TAPE position. With a hole in the tape at the particular position, and with the system in the RUN WITH TAPE mode, the RT24 line is activated with a —24 volt signal and the RTG terminal is coupled to ground. Thus, in the tape reader control switches 138, the lamps 154 in each tape sensor position are energized. Push buttons 155 in each channel on the tape reader control switches 138 may be used to hold the T1 to T8 signals false for test purposes if the clock select switch 106 in the clock signal generating circuits 104 is held in the test position. Under these conditions the TGRD terminal is coupled to ground, and the T1 terminal is coupled to ground through the associated push button 155. Note that only one of the eight sets of tape reader switches 152, lamps 154 and push buttons 155 has been shown.

The various selector circuits and switches previously described and the logic terms which are generated as a result, should be borne in mind in order to understand the operation of the mode control system 66. Obviously, the number of selector switches and circuits may be greatly reduced if it is necessary or desirable to sacrifice some of the versatility of the system. However, all of the options which are presented by the system as described have been found to be useful in achieving the desired end results of thorough and rapid testing of the wiring of a unit under test, operation in a variety of modes and verification of the correctness of operation of the testing system itself.

MODE CONTROL SYSTEM

The organization and operation of the mode control system 66 may be understood by those skilled in the art from the logical equations given below, which are exemplified in circuit form in FIG. 5, and from the Veitch diagram of FIG. 6. The circuit diagram of FIG. 5 has been included for reference, although the translation between the logical equations given below and the circuit diagram of FIG. 5 can be made mechanically, once the terms of the logical equations derived from the control inputs have been defined, as above. The Veitch diagram of FIG. 6 is a particularly convenient and widely used means of describing the functioning of a logical system. A Veitch diagram defines successive operative steps in terms of the operating states of the controlling bistable elements of the system. The present system has 7 flip-flops designated below as M1 to M4 and A1 to A3, and 4 one-shot multivibrators, designated below as DS, DT, DL, and DR, the multivibrators or one-shots being used for timing purposes. Three of the flip-flops (A1, A2, and A3) are used in the SCR counter, and are not directly controlling in the mode control system 66. A number of gates, hereafter classified as primaries and logic drivers, and a number of inverters are utilized for sequencing the states of the mode control flip-flops in accordance with the logical equations in the circuit diagram of FIG. 5.

The Veitch diagram constitutes a two coordinate grid representing different states of the bistable elements, here the first four flip-flops, terms M1 to M4. For 4 bistable elements there are accordingly 16 possible states, and these are here arranged in a square with 4 on each side, and with a rectangle at each of the 16 positions. For each of the 16 posisble positions there is a unique coordinate address identified by the position along each of the vertical (V) and horizontal (X) axes. The states of all four flip-flops are then identifiable for each rectangle, by reference to marginal brackets. Where a bracket encompasses a vertical column or a horizontal line, rectangles within that column or line represent one-valued states of the associated flip-flop. The rectangles outside the bracket for that flip-flop represent the zero-valued state. Thus the rectangle labeled IDLE in the upper left-hand corner of the Veitch diagram is outside the two central columns bracketed by M1 the two central horizontal lines bracketed by M3, the two right-hand vertical columns bracketed by M2 and the two lower horizontal lines bracketed by M4. Accordingly, when the system is in the IDLE phase, all four of the flip-flops are in their zero-valued states. For convenience, the steps between different rectangles or logical system states are designated by arrows. These state changes are undertaken in each instance at a clock pulse time, when the remaining logical conditions are satisfied. For convenience also, some of these logical conditions have been indicated in conjunction with the arrows on the Veitch diagram.

The logical equations for the four mode control flip-flops M1 to M4 are as listed below. The terms to the left of the equal sign designate the flip-flop concerned. In these equations the prefix "1" or "0" before the flip-flop designation (e.g., the "1" before "M4") designates the input terminal to which the equation is applicable.

```
          M0*
1M4=M4'   M3'   M2'   M1'           DR'    TGO
          CD*
    +M3'  M2'   M1    LSQ'   E
0M4=M3    M2'   M1'   (
                      SER'
                      +M3   REW'   T7
                      +T8   )
    +M2'  M1    LSQ'
          M0*
1M3=M4'   M3'   M2'   M1'    (
                             SB    HALT
                                   A32'*          HOM*
                        + SB  A3'  A2'   A1'  H0  T7)
          DRE*
    +M2   M1    DR   ER
          CD*                A31*
    +M3'  M2'   M1   LSQ'    A3   A1    E'
    +M4   DL
0M3=M4'   M2'   M1
    +M1'  DR    DL'
    +M4   M2'   M1'
1M2=M3'   M1    E
    +M3'  M1'   DL
0M2=LSQ'  (
                 M1'    PS'   DL'   TGO'
            +M3  M1     ER'   DR'   )
1M1=M4'   M3    SB'    DL'    DR'   LSQ
0M1=M4    M2'   LSQ'
          CD*
    +M3'  M2'   M1    LSQ'   HALT   E'
          CD*                A31*
    +M3'  M2'   M1    LSQ'   A3  A1   E'
```

In the above equations, and as will also appear below, certain primary terms appear in a number of the equations. These primary terms have been underlined and have been given a separate primary designation immediately above the pertinent part of the equation. Thus, in the term $$A31^*$$
$$A3A1$$

the designation of A31* refers to the primary terms A3 A1.

This system also includes the four previously mentioned one-shot multivibrators, which are termed the DS one-shot, the DT one-shot, the DL one-shot and the DR one-shot. The DS one-shot multivibrator has a duration of 1.0 milliseconds, and is used as previously described, to control the advance of the stepping switch. The DT one-shot provides a 4.5 millisecond signal for operating the tape reader drive solenoid. If the tape reader is not to be used, this one-shot is not employed, so that it may be arranged on a separate circuit card and removed from the system. The DL one-shot provides a 32 millisecond delay which is used to interrupt electronic scanning when the stepper is advanced. The DR one-shot provides a 300 millisecond delay which is used for several purposes.

The logical equations for the one-shots are as follows, with the prefix "1" before the flip-flop designation (e.g., "1" before "DS") designating that the equation is applicable to input terminal "1":

```
           PN*                                A31*
                        CU#
1DS=M2'   M1     [M3    +M3'    E']   LSQ'   A3  A1
           M0*
    +M4'  M3'    M2'    M1'     DL
           PD*                                A31*
                        CU#
1DL=M2'   M1     [M3    +M3'    E']   LSQ'   A3  A1
           M0*
    +M4'  M3'    M2'    M1'     LSQ'   PS
           M0*
    +M4'  M3'    M2'    M1'     LSQ'   HS   H9'
    +M1   M3'    M1'
           PD*
                        CU#
1DR=M2'   M1     [M3    +M3'    E']   LSQ'   HALT
           PD*                                A31*
                        CU#
    +M2'  M1     [M3    +M3'    E']   LSQ'   A3  A1  SSB   S6
    +M3'  M2     ER
                 ML1*
    +M3'  M2'    M1     E
           PD*                                A31*
                        CU#
1DT=M2'   M1     [M3+   M3'     E']   LSQ'   A3  A1  RT
    +M4   M3'    DL
```

It is sometimes convenient and more economical to use individual primary gates suitable for driving a number of circuits simultaneously, and these primaries have the following equations:

```
                       Primaries
A31*=A3         A1
A32'*=A3'       A2'
 CD*=M3'        M2'     M1      LSQ'
                                CU#
CUP*=M2'        M1     [M3     +M3'   E']   LSQ
HOM*=H0         T7
 MO*=M4'        M3'     M2'     M1'
 ML1*=M2'       M1
                                CU#
 PD*=M2'        M1     [M3     +M3'   E']   LSQ'
                        A32'*
  ET=T1         A3'     A2'     A1'
                        A32'*
    +T2         A3'     A2'     A1
    +T3         A2      A1'
    +T4         A2      A1
    +T5         A3
 CU=M3
    +M3'        E'
                 ML1*
DSCR=M4'        M2'     M1      C
    +M3'        M1      DR'     C
 EP=EF
```

The inverters which are employed have the following terms:

```
          INVERTERS
ACR=M3'      M2      M1
C10'=A3      SH
 EP'=EP#
TFS=DT'
    +M4     FWD'
```

The equations for the relay network drivers are the following:

```
              RELAY NETWORK DRIVERS
              TFS
FWDD=(DT'    +M4  FWD')¹
MDC= M3'      M2   M1
                   ACR
 AC=(M3'      M2   M1)¹
 PH=M4'       M2   M1
REVD=M4       DT   FWD'
              MO*               A32'*        HOM*
 RL=M4'       M3'  M2'   M1'   A3'  A2'  A1  H0  T7  RUN
```

In addition, the three flip-flops for the SCR counter, which cycles in a binary fashion, have the equations set out below. The A-designated flip-flops are activated only at their trigger inputs, designated 01.

```
                 CUP*
                        CU#
01A3=M2'    M1    [M3    +M3'    E']    LSQ    A2    A1
                 CD*
    =M3'    M2'    M1          LSQ'    A2'    A1'    E
                 A31*
    +M1'    A3    A1
                 CUP*
                        CU#
01A2=M2'    M1    [M3    +M3'    E']    LSQ    A1
                 CD*
    +M3'    M2'    M1          LSQ'    A1'    E
                 CUP*
                        CU#
01A1=M2'    M1    [M3    +M3'    E']    LSQ
                 CD*
    +M3'    M2'    M1          LSQ'    M3'    E
                 A31*
    +M1'    A3    A1
```

Selection of test mode.—When power is turned on, the mode control flip-flops M1 through M4 are forced to the false state, and the system goes into the IDLE mode. From the IDLE mode, the operator may choose one of three wiring test sequences. He may manually control the stepper, or manually control the tape reader, or he may initiate scanning of the various test positions. The scanning operation may be carried out either one step at a time under operator control, or an entire 130 pin sequence may be tested, with the program stopping only if an error is detected. The successive scan also involves the alternatives of running with or without the tape command signals. Inasmuch as the most used mode of operation will involve repetitive scanning of successive connector banks to locate short and open wiring errors in the shortest possible time, this mode of operation will be described first.

RUN operation.—In the following description, the tape reader is to be utilized, and the HALT/RUN switch is set in the RUN position. The stepping switch is initially at the 26th or HOME position, so that the HO signal is at the true level. The SCR counter is at the count of zero, so that the counter need not be reset. The system then shifts from IDLE to WAIT by shifting the M3 flip-flop to the one valued state, by satisfying the conditions of the first "OR" term for the 1M3 input. Specifically, that equation is—1M3= M4' M3' M2' M1' (SB HALT+SB A3' A2' A1' HO T7). When the start button is depressed, therefore, all of the M flip-flop prime terms are true, the SB signal is present, the SCR counter is set to zero and all of the three A designated (SCR) flip-flops are in the zero-valued state, and the HO term is true. The T7 term represents the seventh channel of the tape reader output, and is true for each frame of a block on the paper tape where each pin on a bank of connections is to be tested. Note that the condition of the first OR term for M3 is satisfied, even though the SB HALT term is not true, because this is OR'd with the remainder of the parenthetical term. The explanation of this first step has been given in detail, in order that appropriate reference may be made to the logical equations or to the circuit diagram of FIG. 5 in order to verify each mode change. Hereafter, however, these terms will merely be set forth in abbreviated fashion, and it will be understood that the controlling term has merely been extracted from the complete logical equation for ease of reference.

The SCR counter, comprising principally the A flip-flops, goes through six different states from C1 to C5 in succession, then to CX to complete the cycle. The SCR counter then returns to C1 to start a new cycle. The C1 state corresponds to the condition in which the A1, A2 and A3 flip-flops are all zero valued.

When the start button is released, the system can then proceed through a test of open and short errors for five successive pins, following which a short delay is introduced as the stepping switch and the tape reader are mechanically advanced. In each test of five successive pins, the system switches from the WAIT mode to the START TEST mode, to the TEST mode, and back to the WAIT mode.

The actual test sequences are carried out while remaining in the TEST mode for 10 clock pulses, assuming that no error is detected.

From the iniital WAIT mode, the system shifts after release of the start button to the START TEST mode on the next clock pulse concurrent with LSQ.

$$1M1 = M4' \; M3 \; SB' \; DL' \; DR' \; LSQ$$

Immediately on the next clock pulse, the system switches to the TEST mode.

$$OM3 = M4' \; M2' \; M1$$

The system then remains in the TEST mode for 10 clock pulses, with the open and short tests being performed during the LSQ and LSQ' phases respectively. During this time, the SCR counter goes through its five counts. The AC waves of opposite phase are concurrently applied to the fired SCR pairs to perform the open and short tests for each pin. Concurrently, the state of the SCR counter controls the sensing of the different ones of the channel positions T1 to T5 in a given character on the tape, as shown by the series of terms for the logic driver ET in the logical equations. A description of the sequences which are followed when an error is detected is provided below.

The TEST sequence at each pin takes place by firing the appropriate SCR's at a proper time related to each half-cycle of the applied AC voltage. The open wiring test is made when LSQ' is true, and the AC voltage applied to the master unit is on its positive half-cycle. If there are no open wiring chains, the SCR's turn off as the amplitude of the AC voltage decreases. At the next clock pulse, at LSQ time, the same pair of SCR's are fired while the SCR counter is advanced to the next count to prepare for the test on the next pin. On this firing of the SCR's, LSQ is true and the negative excursion of the AC voltage is applied to the master to check for shorted wires.

At the same time as the SCR's are fired for the short test, the SCR counter is advanced to the next count to prepare for the test on the next pin. After the 10 clock pulses in the five pin sequence have been used, the SCR counter goes to CX, and on the following clock pulse the stepping switch and the tape reader are pulsed forward. Both the 1.0 millisecond DS multivibrator and the 32 millisecond DL1 shot multivibrator are energized, the former to initiate the advance and the latter to interrupt the electronic scan.

$$1 \; DL = 1 \; DS = M2' \; M1 \; (M3 + M3' \; E') \; LSQ' \; A3 \; A1$$

The 4.5 millisecond DT one-shot multivibrator is also actuated, to energize the tape reader drive solenoid.

$$1 \; DT = M2' \; M1 \; (M3 + M3' \; E') \; LSQ' \; A3 \; A1 \; RT$$

The RT term is derived from the RTG signal generated when the mode switch 130 is in the RUN WITH TAPE position.

Assuming that the most recent pin tested was not B65 (at the end of a connector bank), then as the DL, DS and DT one-shots are triggered, the mode switches to WAIT where the SCR counter is reset to C1. In the interim, the SCR counter will have switched through the CX state, and an appropriate delay will have been maintained to allow mechanical stepping of both the stepping switch and the tape reader. This function is described in more detail below. After the delay, however, and after the resetting of the SCR counter to C1, and when the D1 one-shot has timed out and the AC voltage phasing is correct, the mode shifts from the WAIT mode to the START/TEST mode. Subsequently, the mode shifts again from START TEST to TEST and another set of five pins is tested as previously described.

The DR one-shot is not triggered unless the last pin tested was B65 (end of connector bank).

$$1 \; DR = PD^* \; A31 \; SSB \; S6$$

If the last pin tested was B65, then the DR one-shot is triggered and the mode shifts from WAIT to IDLE when the DL one-shot has timed out. Hence, the DR one-shot determines whether or not testing is to be continued on to the next pin. The S6 term is taken off an appropriate contact in the stepping switch.

Run without tape mode.—As mentioned previously, the tape command signals enable test pin results to be used or disregarded in accordance with the program stored on the tape. At the RUN control switch 145, the tape reader control panel is disconnected by turning the switch to the OFF position, so that TGO is false and TGO' is true. The tape signals T1 to T5, T7 and T8 remain true during testing under these conditions.

Error mode.—Separate mode sequences are undertaken to identify open and short errors as to type and pin position. Additionally, during the error mode, DC voltages are supplied to the resistor bridges to increase the brilliance of the neon lamps. Once the operator has made desired notations or corrections, testing is resumed by depressing and releasing the ERROR reset button. The system continues testing from the point at which an error existed, starting with the "short" test at the same pin at which an "open" error was detected.

The OPEN ERROR sequence is initiated from the TEST mode. If an open error is present, the error is sensed at some time before the peak of the sine wave is applied to the resistor bridges. The error flip-flop is set and the E term is true before the next true-false transition of the clock. When an open test is being performed, LSQ is true at the clock transition. Hence, the mode changes by setting the M2 flip-flop to the one-valued state, so going from the TEST to the OPEN ERROR state.

$$1M2 = M3'\ M1\ E$$

Because the LSQ' term is false at this step, the conditions which are required to go to the SHORT ERROR mode are not satisfied. Simultaneously, however, the DR one-shot is triggered to prevent firing of the SCR's until the relays in the system have been appropriately switched.

$$1DR = M3'\ M2\ ER$$

In the OPEN ERROR mode the MDC relay driver is turned on to switch the DC voltage.

$$MDC = M3'\ M2\ M1$$

The PH relay driver is also turned on to apply the positive (+200 v.) and negative (−120 v.) DC voltages to the appropriate lines and to light the OPEN ERROR indicator.

$$PH = M4'\ M2\ M1$$

The wiring chains themselves, however, are not energized with the DC voltages until after the DR delay, at which time the pair of SCR's associated with the pin under test are fired in accordance with the ML1* and A32* terms given below in conjunction with the SCR logic.

The system therefore remains in the OPEN ERROR mode until the error reset button is momentarily depressed. Depression of the error reset button sets the ER term true, causing the DR one-shot to be triggered.

$$1DR = M3'\ M2\ ER$$

The DR one-shot is employed to insure that the test voltage relays have switched to their appropriate states before testing is resumed. As DR goes true, the tester shifts out of the OPEN ERROR mode into the WAIT FOR AC mode.

$$1M3 = M2\ M1\ DR\ ER$$

In this mode, the MDC term goes false and the AC voltages are reapplied at the relay drivers. After the DR delay is terminated, and the operator has released the momentarily actuated error reset button, the mode flip-flops shift to the START TEST mode at the next time that LSQ' and the clock pulse are true.

$$0M2 = LSQ'\ M3\ M1\ ER'\ DR'$$

The proper LSQ phase is required in order to insure that the first test after reset is a "short" test on the same pin that caused the error. The mode flip-flops stay in the START TEST mode for one clock pulse and on the next true-false transition of the clock, with LSQ true, a "short" test is performed. At the same time, a clock pulse shifts the mode flip-flops to the Test state in the normal manner, firing the appropriate pair of SCR's, while advancing the SCR counter by one.

$$0M3 = M4'\ M2'\ M1$$

Therefore, in going from the START TEST to the TEST mode, the system resumes testing in the normal manner, performing the "short" test on the same pin and addressing the SCR counter to the next pin.

In the SHORT ERROR sequence, the system provides different functions in order to supply the proper error and count indications. As with the open error, the error flip-flop senses a short error before the peak of the sine wave is applied to the bridge networks. The error is sensed when the LSQ term is true; however, the next true-false transition of the clock does not occur until LSQ' is true. At this time, the mode flip-flops switch to the SHORT ERROR mode.

$$1M2 = M3'\ M1\ E$$

$$1M4 = M3'\ M2'\ M1\ LSQ'\ E$$

The change of the SCR counter also occurs on this clock transition. In the SHORT ERROR mode the MDC relay driver is turned on in order to supply DC voltages to the bridge networks.

$$MDC = M3'\ M2\ M1$$

The PH relay driver, which is placed "on" for an open error, is not "on" at this time. Therefore, the voltages to the resistor bridges are reversed from that of an open error and the SHORT ERROR indicator is turned on. The operation of the DR one-shot and the SCR's is the same as for the open error case. The system thereafter holds the SHORT ERROR indication for the necessary notations or corrections.

As with the open error reset, the system is restarted from the SHORT ERROR mode by depressing the error reset button. The system switches into the WAIT FOR AC mode when the ER term goes true, and the DC voltages are terminated, as with the open error reset. The DR one-shot is actuated when the ER term goes true.

When the error reset button has been released and the DR delay has expired, the system switches from the WAIT FOR AC mode to the COUNT mode on the next clock pulse when LSQ' is true. A separate series is needed at this point because the tester may be at the end of a five pin sequence, or at the end of a connector bank so that immediate return to the START TEST mode is not appropriate.

The system therefore remains in the COUNT mode for two clock pulses. At the end of the first clock pulse the SCR counter is advanced one count, because the next test must be an open test on a new pin. On the following clock pulse the DS, DL and DT one-shots are triggered if the SCR counter was advanced to CX.

$$1DS = 1DL = M2'\ M1\ [M3 + M3'\ E']\ LSQ'\ A3\ A1$$

$$1DT = M2'\ M1\ [M3 + M3'\ E']\ LSQ'\ A3\ A1\ RT$$

With the system in the RUN mode the DR one-shot is triggered only if the most recent pin tested was B65, the last pin on the connector bank. If in the HALT mode, the DR one-shot is always triggered on this pulse.

$$1DR = PD*\ A31 -\ SSB\ S6$$

When the one-shot multivibrators are fired, the system also shifts to the WAIT mode.

$$0M1 = M4 \; M2' \; LSQ'$$
$$0M4 = M2' \; M1 \; LSQ'$$

In the WAIT mode, the SCR counter is reset to C1 if the count was CX. The mode switches to IDLE when DL' is true and if the tester is in the HALT state, or if the B65 pin was tested, as indicated by the DR one-shot.

$$0M3 = M1' \; DR \; DL'$$

Otherwise, the mode switches to the START TEST position when DL' is true.

$$1M1 = M4' \; M3 \; SB' \; DL' \; DR' \; LSQ$$

The tester thus continues testing in its normal manner from the START TEST mode.

HALT OPERATION.—With the HALT/RUN switch set in the HALT position, the system makes open and short tests one pin at a time, and requires a further activation to test the next succeeeding pin. Testing is initiated by depression and release of the start button. Starting from the IDLE mode, depression of the button switch to the WAIT mode.

$$1M3 = M4' \; M3' \; M2' \; M1' \; SB \; HALT$$

During the WAIT mode, the SCR counter is reset to C1 if the count is at CX. When the START button is released, and the SC voltage is of the proper phase as determined by the LSQ signal, the mode switches to START TEST.

$$1M1 = M4' \; M3 \; SB' \; DL' \; DR' \; LSQ$$

The system stays in the START TEST mode for one clock pulse, and because of the fact that it was set at the LSQ phase, the subsequent clock transition occurs when LSQ' is true. Accordingly, the SCR counter is not advanced when the START TEST mode is entered via the WAIT mode. At the end of one clock pulse the mode then switches from START TEST to the TEST mode.

$$0M3 = M4' \; M2' \; M1$$

Simultaneously, the appropriate pair of SCR's are fired, with LSQ' true. Accordingly, the AC voltage applied to the master unit is on its positive half-cycle and the test constitutes an open wiring test. If an error exists, the system then shifts into the OPEN ERROR mode and must be reset as previously described. If there are no open wiring chains at the pin under test, the SCR's turn off as the amplitude of the AC voltage decreases. At the next succeeding clock pulse, the same pair of SCR's are fired while the SCR counter is advanced to the next count to prepare for the test on the next pin. On this firing of the SCR's, LSQ is true and the negative excursion of the AC voltage is applied to the master to test for shorted wires.

On the true-false transition of the clock, the mode returns to the IDLE state if there are no errors and the SCR counter is not at CX.

$$0M1 = M3' \; M2' \; M1 \; LSQ' \; HALT \; E'$$
$$1DR = M2' \; M1 \; [M3 + M3' \; E'] \; LSQ' \; HALT$$

However, if the SCR counter was advanced to the CX state during the TEST mode, then the stepping switch and the tape reader must be moved. Accordingly, the DS, DT, DL and DR one-shots are all triggered.

$$1DS = M2' \; M1[M3 + M3' \; E'] \; LSQ' \; A3 \; A1$$
$$1DT = M2' \; M1 \; [M3 + M3' \; E'] \; LSQ' \; A3 \; A1 \; RT$$
$$1DL = M2' \; M1 \; [M3 + M3' \; E'] \; LSQ' \; A3 \; A1$$
$$1DR = M2' \; M1 \; [M3 + M3' \; E'] \; LSQ' \; HALT$$

Simultaneously the mode switches to WAIT until the end of the DL delay before going to IDLE, as previously described.

$$0M3 = M1' \; DR \; DL'$$

The test of a single pin under HALT operation is therefore completed with the system again in the IDLE state. To test the next pin, the START button must be actuated as before.

Manual control of stepping switch or tape reader.— These sequences are undertaken when it is desired to place the stepping switches or tape in particular operating positions, usually in the HOME position for the stepping switch and at the position corresponding to the beginning of a connector for the tape reader. The stepping switch control is effected by the operation of the ADVANCE stepper button 77 of FIG. 4, or by the HOME stepper button 80 of FIG. 4, whereas the tape reader control is derived from the RUN control switch 145 of FIG. 4

Manual control of the stepping switch is effected when the system is in the IDLE mode. The operator depresses the ADVANCE stepper button or the HOME stepper button. If the stepping switch is not already at the HOME position, the DL one-shot is fired in phase with LSQ'.

$$1DL = M4'M3'M2'M1'LSQ'(PS + HSHO')$$

At the next clock pulse, DS is fired to advance the stepper and the mode is switched to the WAIT FOR STEPPER state.

$$1DS = M4'M3'M2'M1'DL$$
$$1M2 = M3'M1'DL$$

After the DL delay, and the release of the advance stepper button if it was depressed, the mode is returned to ILDE in phase with LSQ'.

$$0M2 = LSQ'M1'PS'DL'TGO'$$

If it is desired to HOME the stepper, the operator must hold the HOME button down until the operation is completed. The LSQ' terms and the 1DL and 0M2 logic insure that the DL one shot has at least two clock periods of recovery time.

Control of the tape reader is utilized either in the forward direction, to advance the tape until a hole is sensed in the T7 position, or to rewind the tape until a hole is sensed in the T8 position. The stepping may either be continuous (search) or in individual steps (single). The operator sets the RUN CONTROL switch to the SINGLE or SEARCH position, and sets the DIRECTION CONTROL switch to the forward or reverse position. Movement of the RUN CONTROL switch changes the system to the ADVANCE TAPE mode from the IDLE mode.

$$1M4 = M4'M3'M2'M1'DR'TGO$$

Subsequently, the DL one-shot is fired, after one clock pulse the DT one-shot is fired and the system is switched to the WAIT FOR TR mode.

$$1DL = M4M3'M1'$$
$$1DT = M4M3'DL$$
$$1M3 = M4DL$$

The M2 flip-flop is set to the one-value state because of the same logic utilized in shifting to the WAIT FOR STEPPER mode.

These conditions therefore establish that either the FWDD relay driver is energized if the tape is to be moved forward, or the REVD relay driver is energized if the tape is to be moved reverse.

$$FWDD = (DT' + M4FWD')'$$
$$REVD = M4DTFWD'$$

After the DL delay (and the operator has released the RUN CONTROL switch), the mode is switched from the WAIT FOR TR state to the SAMPLE state because of the 0M2 gate which returns the system to the IDLE mode when operating the stepping switch manually. The system returns, after one clock period, from the SAMPLE state, to either the ADVANCE TAPE state, or to the IDLE state. With the RUN CONTROL switch in the SEARCH position, and with no hole in the seventh channel of the tape, the system goes to the ADVANCE TAPE mode.

$$OM3 = M4M2'M1'$$

If, however, the tape is to be advanced only one frame, the SER' term is true; therefore, the mode is switched to the IDLE state.

$$OM4 = M3M2'M'SER'$$

The system is also returned to the IDLE mode if there is a hole in channel seven of the tape and the operator was searching for the marker at the beginning of the connector.

$$OM4 = M3M2'M1'REW'T7$$

If there is no hole in channel seven and the operator is searching for the beginning of the connector, the tape is advanced again, and successively until the beginning of the connector is located on the tape. If rewinding, the operation is similar, except that the system is switched to the IDLE mode if there is a hole is channel eight.

$$OM4 = M3M2'M1'T8$$

The above description of the RUN, HALT, stepping switch and tape reader controls may be compared to the Veitch diagram of FIG. 6. It is apparent therein that all of the different modes set out in the Veitch diagram are utilized in the above-described operation. There are, however, a considerable number of other self-testing features and checking features which are also provided in the system.

CHECKING AND TEST MODES

*Ready light.*—A "ready" lamp on the wiring tester control panel indicates that the tester is at the first pin on a connector and is ready to scan the connector. The tester will not indicate that it is ready unless it is in (1) the IDLE mode, (2) the counter, stepping switch, and tape reader are at the A01 (first pin on a connector) position, and (3) the tester is set for RUN operation.

*Turn on test.*—The relay network includes a relay K2 which is used when the mode switch 130 (FIG. 4) is placed in TURN ON position. When K2 is energized, only positive voltages are applied to the MASTER SCR and UNIT UNDER TEST SCR busses. Thus, the potential across a bridge network will always be unbalanced in the positive direction, and all of the neon bulbs in the bridge network energized, and from both sides of each bridge. This test insures that the bulbs do in fact turn on for a positive voltage imbalance.

If the mode switch 130 is set in the REVERSE position, the K3 relay is energized. In this test, no neon bulb is supposed to light. If a neon bulb does break down and fire, this is an indication either that the bridge networks are defective or that the neon bulb fires at too low a voltage and must be replaced.

The presence of these self-testing schemes insures to a high degree of certainty that the wiring tester itself is in proper condition for reliable operation.

The relay network also includes relays K1, K5 and K6 which suply AC or DC current to output busses coupled to the master SCR's and the UNIT UNDER TEST SCR's. In its ON state, the K1 relay applies AC from the source to the two output busses. When the K1 relay is released, DC is supplied to these busse, as the polarity of the DC is determined by the relays K4, K5 and K6. The phase relay K4 determines which output bus receives plus or minus DC voltages. The K5 relay, when energized, applies $-120$ volts to one or the other of the two busses depending on the phase relay. The K6 relay, when energized, applies $+200$ volts to one or the other of the two output busses dependent upon the phase relay. The K1 and the K4 relays are energized when an error is detected, so that all neon bulbs which are fired are held illuminated at increased intensity.

ADDITIONAL GATING AND DISPLAY CIRCUITS

*SCR circuits.*—The three flip-flops labeled A3, A2 and A1 determine which pair of SCR bridges is fired at each pin, and also control the logic for the display system described below. Under control of the primary term CUP*, the SCR counter shifts from successive states C1 through C5, then to CX and back to C1. The CX state is used, as previously described, to permit adequate time for operation of the stepping switches and tape reader. Because the results of the test are not available until the following clock pulse, an error identified in the second phase of a test follows after the counter has been advanced to the next count. Therefore, the counter is reversed for one count whenever the primary term CD* is generated concurrently with the error signal E.

The SCR gating circuits which are to be fired are determined both by the SCR counter and the tape reader signals, in accordance with the following logic:

$$SCR1 = (M4'M2'M1C + M3'M1DR'C)A3'A2'A1'ET$$

$$SCR2 = (M4'M2'M1C + M3'M1DR'C)A32'*A1ET$$

$$SCR3 = (M4'M2'M1C + M3'M1DR'C)A2A1'ET$$

$$SCR4 = (M4'M2'M1C + M3'M1DR'C)A2A1ET$$

$$SCR5 = (M4'M2'M1C + M3'M1DR'C)A3A1'ET$$

where $$ET \text{ equals } T1A3'A2'A1' + T2A3'A2'A1 + T3A2A1' + T4A2A1 + T5A3$$

The term in parentheses is a timing term to insure that firing takes place during the test mode.

When the tape reader is disconnected, T1 through T5 are always true, hence, the SCR counter determines which pair of bridges are to be fired. With the tape reader connected in the MODE switch at RUN WITH TAPE, T1 through T5 will be true only if there is a hole in the corresponding tape channel. Therefore, an SCR gate can be true only if the SCR counter is at the correct count and there is a hole in the corresponding channel of the tape.

*Display logic.*—It is preferred to employ a set of four tubes of the "Nixie" type to indicate the position of the error on the test bank. For convenience, the SL and SH signals derived from the stepping switch (FIG. 4) are returned to enable the logic circuitry to be minimized. Alphabetic indications are provided directly from the SSA and SSB signals to indicate whether the pin under test is on the A side or the B side of the connector. In addition, a display light for each of the open and short errors is lit from the error open line (EOL) or error short line (ESL), being driven by contact from the phase relay K4 in the relay network.

While there have been described above and illustrated in the drawings various forms of wiring testing systems in accordance with the invention, it will be appreciated that the invention is not limited thereto. Accordingly, all modifications, alternative forms and variations falling within the scope of the appended claims should be considered to form a part of the invention.

We claim:

1. The method of testing the wiring of a unit under test against a master unit by comparison for short and open errors comprising the steps of coupling a plurality of points at the unit under test to individual selected terminals of a plurality of different bridge networks by a second connector, the bridge networks being unconnected except through the units, applying test voltages which are unbalanced relative to ground to the selected and opposite terminals of individual networks, detecting voltage imbalances at bridge networks other than at the bridge network to which the voltages are applied, stopping the successive test voltage applications at the time at which a voltage imbalance is detected.

2. The invention as set forth in claim 1 above, wherein the bridge networks include illuminating gas discharge elements which are coupled to be energized on application of a voltage imbalance of a given polarity sense, wherein the applied test voltages are derived from an alternating current source which is imbalanced relative to ground, terminals of the alternating current source being coupled in reverse to the terminals of a given bridge network during alternate half-cycles of a wave, and further including the step of increasing the brightness of an illuminated discharge element by application of a higher direct current voltage difference after a voltage imbalance is detected.

3. A circuit for comparing the wiring of one wired module to a second wired module comprising at least two resistance bridges of like characteristics, each having four resistances coupled together so as to present a pair of input terminals at one pair of junctions therebetween and a pair of output terminals at another pair of junctions therebetween, and at least two gas discharge firing means, each coupled to a like output terminal of a different bridge, and each having a substantially like minimum firing level, means coupling test voltages which are unbalanced relative to ground to the input terminals of the resistance bridges, means coupling one input terminal of each bridge to a point on one module and the other input terminal to a like point on the second module, the bridges being coupled only through the wiring of the two modules, means for reversing the voltages applied to the input terminals of the bridges, and means for detecting firing of any of the firing means.

4. A circuit for comparing the wiring of one electronic chassis unit to a second electronic chassis unit comprising at least two resistance bridges of like characteristics, each having a pair of input terminals and a pair of output terminals, at least two gas discharge bulbs, each coupled to a like output terminal of a different bridge, each bulb requiring a selected minimum voltage level at the output terminal to become energized, the resistance bridges being arranged to normally hold the discharged bulbs below the selected minimum level, means providing a pair of potential levels of a maximum given difference, one only of the potential levels being sufficient and necessary to energize the discharge bulbs when applied to a bridge without the other level, and the average of the two potential levels being insufficient to energize the discharge bulbs, means coupling like points on the first and second electronic chassis units to opposite input terminals of successive bridges, the bridges being coupled only through the wiring of the first and second electronic chassis units, switching means for applying a pair of potential levels to the opposite input terminals of each bridge in succession, the switching means including means for reversing the potential levels at the input terminals, and means coupled to the discharge bulbs for detecting firing of any of the discharge bulbs in response to a voltage imbalance in the associated bridge.

5. A circuit for comparing the wiring of one electronic chassis unit to a second electronic chassis unit for detection of shorts and discontinuities comprising at least two resistance bridges of like characteristics, each of the resistance bridges having a pair of input terminals and a pair of output terminals, at least two neon discharge bulbs, each coupled to a like output terminal of a different bridge, each bulb requiring a selected minimum voltage level at the coupled output terminal to be fired thereby, the resistance bridges having arms arranged to normally hold the potential of the discharge bulbs below the selected minimum level, voltage supply means providing a pair of signals having a maximum given voltage difference, and defining a pair of test voltage levels of opposite polarity and having an average which is other than zero, one only of the voltage levels being sufficient and necessary when applied alone to the output terminal of a bridge to energize the bulbs, the average of the two voltage levels being insufficient to energize the bulbs when applied together to a bridge, means coupling like points on the first and second chassis units to opposite input terminals of individual and different bridges, the bridges being connected together through nonresistive circuit paths only through the wiring of the first and second electronic chassis units, switching means for applying the pair of test voltage levels to the opposite input terminals of each bridge in succession, the switching means including means for reversing the potential levels, such that the test voltages applied to a selected bridge do not result in firing of the neon discharge bulb coupled directly to that bridge, but may result in voltage imbalance at a different bridge due to unlike wiring connections between the two chassis, and means coupled to the neon discharge bulbs for detecting firing of any of the bulbs.

6. The invention as set forth in claim 5 above, wherein the means for supplying test voltages comprises an alternating current source providing a signal having a greater positive maximum excursion than its maximum negative excursion, with the positive alone being sufficient to fire the neon discharge bulbs when applied alone to the coupled input terminal of a bridge.

7. A tester for comparing wiring connections in two units having a number of test points comprising a plurality of bridge network means, each having two pairs of terminals, one pair only of the two pairs of terminals of each bridge being coupled with like test points from each of the two units, the bridge networks being coupled together only through the wiring connections in the units under test, means coupled to each bridge network for sensing voltage imbalances in excess of a predetermined amplitude, and means for applying test voltages to the indivdual bridge networks, said means providing test voltages of opposite polarity which are unbalanced relative to ground and which are related to the amplitude to which the sensing means is responsive such that the sensing means is activated when one of the voltages is present, but not when both are present or when the other is present alone.

8. The invention as set forth in claim 7 above, wherein the system includes in addition means for reversing the test voltages at a particular bridge network, and means for successively scanning the test voltages along the bridge networks.

9. A wiring testing system for electronic assemblies using modular construction and providing a test unit to be compared to a master unit, comprising a plurality of bridge networks, each including a first pair of like resistors having a first midpoint and a second pair of like resistors having a second midpoint, the bridge networks also each having first and second input terminals between the first and second resistor pairs, a plurality of neon indicators, each connected to the first midpoint of a different bridge network, and each having a firing voltage in excess of a selected value, biasing means coupled to the second midpoints of each of the bridge networks for applying a selected bias voltage thereto, connector means coupling like wiring points from said test and master units to said bridge networks, each given pair of like wiring points being coupled to the first and second input terminals of a different bridge network, test voltage means providing unequal test voltage levels, one of which is sufficient to energize a neon indicator, scanner means coupled to the test voltage means for successively connecting test voltages to the first and second input terminals of individual bridge networks, the scanner means including means for reversing the test voltage levels at the input terminals, the test voltages being selected relative to the bias voltage and the neon indicator firing voltage and the resistor values such that a neon indicator fires when a given one of the test voltages is present alone, but not when both test voltages are present, or the other test voltage is present alone, and error detecting means coupled to all of the neon indicators and responsive to the firing of any.

10. A wiring testing system for electeonic assemblies using modular construction and having a plurality of terminals for receiving an input connector, the assemblies including a test unit to be compared to a master unit, and the system comprising a plurality of bridge networks, each including a first pair of like resistors having a first midpoint and a second pair of like resistors having a second midpoint, the bridge networks also each having first and second input terminals, a plurality of neon indicator bulbs, each connected to the first midpoint of a different bridge network and each having a firing voltage in excess of a selected value, biasing means coupled to the second midpoints of each of the bridge networks, for applying a bias voltage of approximately +40 volts thereto, error detecting means coupled to all of the neon indicators and responsive to the firing of any by virtue of the existence of a voltage level substantially in excess of +40 volts at the first midpoint of one or more of the bridge networks, a +200 test voltage source, a −120 test voltage source, scanner means coupled to receive the +200 volt and −120 volt test voltages and coupled to apply said voltages across the first and second input terminals of individually selected ones of said bridge networks, control means coupled to said scanner means for controlling said scanner means to apply said test voltages across said bridge networks in a successive fashion, said control means and said scanner means cooperating to provide two phase sequences at each bridge network in a first of which a potential difference of one polarity sense is applied across said first and second input terminals, in a second of which a potential difference of the opposite polarity sense is applied across said first and second input terminals, connector means coupling like terminals from said test and master units to said bridge networks, each given pair of like terminals of the two units being coupled to the first and second input terminals of individual bridge networks, such that an error indication is generated by a voltage imbalance which causes a neon indicator to fire at a bridge network other than the bridge network directly receiving the test voltages, and the nature of the error is indicated by the phase in the two-phase test sequence during which the neon indicator fires.

11. A wiring testing unit for detecting short and open conditions in the wiring of a unit under test by comparison to the wiring of a master chassis and comprising at least a pair of bridge networks, each of the bridge networks including a first pair of like resistors having a first midpoint and a second pair of like resistors having a second midpoint, the bridge networks also each having first and second input terminals, a pair of neon indicator bulbs, each connected to the first midpoint of a different bridge network, and each having a breakdown voltage in excess of a selected value, biasing means coupled to the second midpoints of each the bridge networks, for applying a selected bias voltage thereto, connector means coupling like terminals from said test and master units to said bridge networks, each given pair of like terminals being coupled to the first and second input terminals, respectively, of a different bridge network, means providing test voltages to the individual networks, said test voltages having equal potential differences from said bias voltage but the differences being in opposite senses, and the voltages being selected relative to the characteristics of the neon indicators such that the application of a selected one of the voltages alone will imbalance the bridge network, causing the neon indicator to fire, whereas the application of both voltages to the opposite input terminals will result in a balanced condition, and the application of the other test voltage alone will not be sufficient to cause the neon indicator to fire, and means for reversing the test voltages applied to an individual one of the bridge networks, whereby a dissimilarity in the wiring paths between one of the bridge networks and another of the bridge networks in the unit under test as compared to the master unit results in an imbalance at a different one of the bridge networks of the type which results in firing of the corresponding neon indicator.

12. A wiring testing system for comparing the wiring of a modular unit under test to a modular master chassis comprising the combination of a plurality of bridge network means, each including a voltage responsive firing element responsive to a given imbalance condition in the bridge network, means coupling like terminals from each of the master units and the unit under test to opposing points of an individual different bridge network means, means providing an alternating current test wave at a selected frequency, the test wave providing asymmetrical peak amplitudes, only one of which applied alone to an input terminal of a bridge network is exclusively sufficient to imbalance the bridge network such as to fire the voltage responsive element, and means responsive to the test wave and coupled to the bridge network means for applying the test wave to the opposite input terminals of the individual bridge network means in succesison, the test wave being applied in one polarity relationship during a first half cycle, and then applied to the same bridge network in reverse polarity relationship during the second half cycle of the wave.

13. A system for testing the wiring of modular electronic circuit units having multipin connector banks for receiving plug-in cards comprising a unit to be tested, a master unit like the unit to be tested, means providing a plurality of test banks, each including a plurality of balanced bridge networks, one for each pin to be tested, means coupling individual pins of the connector banks of both units to individual pins of the test banks, such that like pins of each unit are coupled to opposite sides of different individual networks, a scanning control system for successively scanning the individual positions of a single test bank, manually operable test bank means for selectively coupling the scanning control system to any selected test bank, an alternating current power source providing a signal of a fixed frequency coupled to the scanning control system, the alternating current signal providing test voltages which are unbalanced relative to ground, the networks being coupled together only through the wiring interconnections of the units, and means coupled to the networks for sensing imbalances in any of the networks.

14. The invention as set forth in claim 13 above, wherein the scanning control means comprises an electronic switching means and an electromechanical switching means, electronic means having a selected limited number of successive positions, and wherein the electronic switching means is coupled to scan successive positions of the electromechanical switching means within each advance of the electromechanical means.

15. A system for detecting discrepancies between the wiring of a master chassis and a chassis under test, comprising: a plurality of test bridges, each test bridge comprising four different impedance elements which are independent of the master chassis and the test chassis, each test bridge having an error output terminal and each test bridge coupled to like points of the two chassis, the test bridges being arranged in individual banks, a source of an alternating current power signal, scanning circuit means receiving the alternating power signal and including a test bank connector for registry with any of the test banks, the scanning circuit means successively energizing individual test bridges with test voltages of opposite potential differences which are unbalanced relative to ground during successive half-cycles of the power signal, and means coupled to the error output terminals of the test bridges for indicating the existence of an error.

16. The method of testing the wiring of a unit under test against a master unit by comparison for short and open errors which includes the steps of connecting like circuit points from each of the units to first and second opposite terminals of individual bridge networks, the bridge networks being unconnected except through wiring paths in the units, applying test voltages to the first and second opposite terminals of an individual selected bridge network, the test voltages at an individual bridge network comprising the successive half-cycles of an alternating current wave which has a reference level other than ground, and sensing voltage imbalances at bridge networks other than the selected bridge network.

References Cited

UNITED STATES PATENTS

| | | | |
|---|---|---|---|
| 2,869,076 | 1/1959 | Evans | 324—51 |
| 3,264,562 | 8/1966 | Brown | 324—73 |
| 3,333,186 | 7/1967 | Mowery | 324—51 |
| 3,182,253 | 5/1965 | Dorsch | 324—73X |
| 3,253,220 | 5/1966 | Hordosi | 324—73 |

RUDOLPH V. ROLINEC, Primary Examiner

R. J. CORCORAN, Assistant Examiner

PO-1050
(5/69)

UNITED STATES PATENT OFFICE
CERTIFICATE OF CORRECTION

Patent No. 3,549,995          Dated December 22, 1970

Inventor(s) Robert B. Trousdale et al

It is certified that error appears in the above-identified patent and that said Letters Patent are hereby corrected as shown below:

Column 1, line 23, "include" should read --includes--;

Column 2, line 58, after "compared" delete the comma (",") (second occurrence). Column 3, line 6, "circuits" should read --circuit--. Column 4, line 62, after "however," delete "a". Column 5, line 35, "ribbn" should read --ribbon--; line 75, after "part of" insert --the--.

Column 8, line 66, "there" should read --three--. Column 15, lines 63 and 64 should read

A31\*
--A3 A1--

Column 16, line 12, "PN\*" should read --PD\*--; line 65 should read $$--FWDD = (DT' + M4\ \overset{TFS}{FWD'})'--$$

line 68 should read $$--AC = (M3'\ \overset{ACR}{M2}\ M1)'--$$

line 70 should read $$--RL = \underline{M4'\ \overset{MO*}{M3'}\ M2'\ M1'}\ \overset{A32'*}{A3'}\ A2'\ A1'\ \underline{\overset{HOM*}{HO}\ T7}\ RUN--$$

Column 18, line 4, "iniital" should read --initial--. Column 1 line 57, "A32\*" should read --A32'\*--. Column 20, line 75 sho read

--LDR=PD\* A31\* SSB S6--

Column 21, line 24, "switch" should read --switches--.

PO-1050
(5/69)

UNITED STATES PATENT OFFICE
CERTIFICATE OF CORRECTION

Patent No. 3,549,995    Dated December 22, 1970

Inventor(s) Robert B. Trousdale et al    (Continued)

It is certified that error appears in the above-identified patent and that said Letters Patent are hereby corrected as shown below:

PAGE - 2

Column 23, line 8, should read

--OM4 = M3M2'M1'SER'-- line 52, after "energized" and before the period (".") insert --, and only minus voltages are applied to the bridge network line 61, "suply" should read --supply--; line 65, "busse" sho read --busses--. Column 26, line 34, "indivdual" should read --individual--. Column 27, line 3, "electeonic" should read --electronic--; line 56, after "of each" and before "the" ins --of--. Column 28, line 22, "succesison" should read --succession--;

Signed and sealed this 27th day of April 1971.

(SEAL)
Attest:

EDWARD M.FLETCHER,JR.
Attesting Officer

WILLIAM E. SCHUYLER,
Commissioner of Pater